United States Patent
Liu et al.

(10) Patent No.: US 12,523,710 B2
(45) Date of Patent: Jan. 13, 2026

(54) ELECTRIC LEAKAGE DETECTION METHOD FOR ELECTRONIC COMPONENT, ELECTRONIC DEVICE, AND STORAGE MEDIUM

(71) Applicant: HONOR DEVICE CO., LTD., Shenzhen (CN)

(72) Inventors: Dong Liu, Shenzhen (CN); Jing Zhao, Shenzhen (CN)

(73) Assignee: Honor Device Co., Ltd., Shenzhen (CN)

(*) Notice: Subject to any disclaimer, the term of this patent is extended or adjusted under 35 U.S.C. 154(b) by 0 days.

(21) Appl. No.: 18/261,043

(22) PCT Filed: Dec. 9, 2022

(86) PCT No.: PCT/CN2022/138060
§ 371 (c)(1),
(2) Date: Jul. 11, 2023

(87) PCT Pub. No.: WO2023/160122
PCT Pub. Date: Aug. 31, 2023

(65) Prior Publication Data
US 2025/0012872 A1    Jan. 9, 2025

(30) Foreign Application Priority Data
Feb. 22, 2022   (CN) .......................... 202210164991.1

(51) Int. Cl.
   *G01R 31/52*   (2020.01)
   *G01J 5/00*    (2022.01)
   *G01J 5/48*    (2022.01)

(52) U.S. Cl.
   CPC ............ *G01R 31/52* (2020.01); *G01J 5/0096* (2013.01); *G01J 5/48* (2013.01); *G01J 2005/0077* (2013.01)

(58) Field of Classification Search
   CPC ...... G01R 31/2836; G01J 5/0096; G01J 5/48; G01J 2005/0077; G06F 11/3024; G06F 11/3058; Y02D 10/00
   See application file for complete search history.

(56) References Cited

U.S. PATENT DOCUMENTS 9,086,442 B2   7/2015   Mayer et al.
11,536,778 B2  12/2022  Liu
(Continued)

FOREIGN PATENT DOCUMENTS

CN   203324422 U   12/2013
CN   103683185 A    3/2014
(Continued)

*Primary Examiner* — Lee E Rodak
*Assistant Examiner* — Demetrius R Pretlow
(74) *Attorney, Agent, or Firm* — Fish & Richardson P.C.

(57) ABSTRACT

This application provides an electric leakage detection method for an electronic component, an electronic device, and a storage medium, and relates to the field of electric leakage protection technologies for electronic components. The method includes: acquiring, by the electronic device when the electronic device executes the target task, a target temperature value at a target position on the first electronic component measured by a target temperature sensor, where the target temperature sensor is one of the plurality of second electronic components; determining, by the electronic device, a target temperature reference value corresponding to the target position from the temperature distribution information of the first electronic component; and determining, by the electronic device when a difference value between the target temperature value and the target temperature reference value is greater than or equal to a first threshold, that the first electronic component leaks electricity.

20 Claims, 9 Drawing Sheets

(56) References Cited

U.S. PATENT DOCUMENTS

| | | | |
|---|---|---|---|
| 2005/0111183 A1* | 5/2005 | Pokharna | G06F 1/206 |
| | | | 361/679.48 |
| 2007/0001694 A1 | 1/2007 | Jahagirdar et al. | |
| 2007/0219644 A1* | 9/2007 | Sonobe | G06F 1/3203 |
| | | | 700/12 |
| 2013/0046999 A1* | 2/2013 | Jung | G06F 1/206 |
| | | | 713/300 |
| 2015/0046729 A1* | 2/2015 | Fukuoka | G06F 13/24 |
| | | | 713/320 |
| 2015/0073611 A1 | 3/2015 | Jain et al. | |
| 2020/0225723 A1 | 7/2020 | Zonensain et al. | |
| 2020/0379034 A1 | 12/2020 | Khandhar et al. | |

FOREIGN PATENT DOCUMENTS

| | | |
|---|---|---|
| CN | 104345201 A | 2/2015 |
| CN | 105094251 A | 11/2015 |
| CN | 106199365 A | 12/2016 |
| CN | 106886800 A | 6/2017 |
| CN | 108872762 A | 11/2018 |
| CN | 109710482 A | 5/2019 |
| CN | 110716592 A | 1/2020 |
| CN | 110892278 A | 3/2020 |
| CN | 110928387 A | 3/2020 |
| CN | 112881786 A | 6/2021 |
| JP | 2018152930 A * | 9/2018 |

* cited by examiner

Game scenario

ELECTRIC LEAKAGE DETECTION METHOD FOR ELECTRONIC COMPONENT, ELECTRONIC DEVICE, AND STORAGE MEDIUM

CROSS-REFERENCE TO RELATED APPLICATIONS

This application is a national stage of International Application No. PCT/CN2022/138060, filed on Dec. 9, 2022, which claims priority to Chinese Patent Application No. 202210164991.1, filed on Feb. 22, 2022. The disclosures of the aforementioned applications are hereby incorporated by reference in their entireties.

TECHNICAL FIELD

This application relates to the field of terminal technologies, and in particular, to an electric leakage detection method for an electronic component, an electronic device, and a storage medium.

BACKGROUND

With the development of electronic technologies, functions of an electronic device such as a mobile phone and a tablet computer are becoming more powerful, so that a large quantity of electronic components are integrated inside the electronic device, and the electronic components work in cooperation with each other to realize the functions of the electronic device. However, when an electronic component in the electronic device leaks electricity, if the electronic component that leaks electricity is not detected accurately in time, not only the performance and the life of the electronic device will be affected, but also the battery life of the electronic device will be affected.

In the related art, when detecting an electronic component that leaks electricity, limited to the hardware structure of the electronic device, maintenance personnel are required to perform the detection by removing the shell or destroying the hardware of the electronic device. This conventional manual overhaul method is not only time-consuming and labor-intensive, but also inefficient.

SUMMARY

Embodiments of this application provide an electric leakage detection method for an electronic component, an electronic device, and a storage medium, which can reduce detection costs for detecting electric leakage of an electronic component and improve detection efficiency.

The following technical solutions are used in the embodiments of this application.

According to a first aspect, an electric leakage detection method for an electronic component is provided, applied to an electronic device, where the electronic device includes a plurality of first electronic components and a plurality of second electronic components, and the second electronic components are configured to detect temperatures of the first electronic components: the electronic device stores temperature distribution information of each of the first electronic components, and the temperature distribution information is used for indicating a plurality of temperature reference values at different positions on the first electronic component when the electronic device executes a target task; and the method includes: acquiring, by the electronic device when the electronic device executes the target task, a target temperature value at a target position on the first electronic component measured by a target temperature sensor, where the target temperature sensor is one of the plurality of second electronic components: determining, by the electronic device, a target temperature reference value corresponding to the target position from the temperature distribution information of the first electronic component; and determining, by the electronic device when a difference value between the target temperature value and the target temperature reference value is greater than or equal to a first threshold, that the first electronic component leaks electricity.

Based on the first aspect, the electronic device includes a plurality of first electronic components and a plurality of second electronic components, and the second electronic components are configured to detect temperatures of the first electronic components; and when the electronic device executes the target task, the electronic device acquires a target temperature value at a target position on the first electronic component measured by a target temperature sensor, where the target temperature sensor is one of the plurality of second electronic components. Because the electronic device stores temperature distribution information of each of the first electronic components, and the temperature distribution information is used for indicating a plurality of temperature reference values at different positions on the first electronic component when the electronic device executes a target task, the electronic device can determine a target temperature reference value corresponding to the target position from the temperature distribution information of the first electronic component. When a difference value between the target temperature value and the target temperature reference value is greater than or equal to a first threshold, the electronic device determines that the first electronic component leaks electricity, so that a component having an electric leakage problem in the electronic device can be detected, thereby reducing the detection costs and improving the detection efficiency.

In a possible implementation of the first aspect, the temperature distribution information is a temperature contour map, the temperature contour map includes a plurality of closed curves, and temperature reference values on a same closed curve are the same; and the determining, by the electronic device, a target temperature reference value corresponding to the target position from the temperature distribution information of the first electronic component includes: when the target position is located between two adjacent closed curves, the target temperature reference value being a temperature reference value on a closed curve in the two adjacent closed curves that is close to the target position: or determining, by the electronic device when the target position is located between two adjacent closed curves, the target temperature reference value according to temperature reference values on the two adjacent closed curves: or when the target position coincides with a closed curve, the target temperature reference value being a temperature reference value on the closed curve.

In this design manner, the temperature distribution information is a temperature contour map, the temperature contour map includes a plurality of closed curves, and temperature reference values on a same closed curve are the same, so that the electronic device can determine a target temperature reference value corresponding to the target position from the temperature contour map of the first electronic component, thereby improving the accuracy of detecting electric leakage of electronic components.

In a possible implementation of the first aspect, the temperature contour map is established after the electronic device pre-executes the target task at least once under normal circumstances.

In this design manner, the temperature contour map is established after the electronic device pre-executes the target task at least once under normal circumstances, that is, when the electronic device is under normal circumstances, a plurality of temperature reference values of each electronic component are pre-obtained; and then the electronic device performs comparison according to the temperature reference values measured under normal circumstances and the target temperature value actually measured when the electronic device executes the target task, to determine whether the first electronic component leaks electricity, thereby further improving the accuracy of detecting electric leakage of electronic components.

In a possible implementation of the first aspect, the method further includes: performing, by the electronic device, target processing on the first electronic component when the electronic device determines that the first electronic component leaks electricity, where the target processing is used for eliminating leakage of the first electronic component.

In this design manner, when the electronic device determines that the first electronic component leaks electricity, the electronic device performs target processing on the first electronic component. Because the target processing is used for eliminating electric leakage of the first electronic component, that is, in a case that the electronic device detects that the first electronic component leaks electricity, the electric leakage generated by the first electronic component is eliminated, thereby prolonging the service life of the first electronic component, and helping to protect the electronic device.

In a possible implementation of the first aspect, the target processing includes one or more processing types of: reducing a refresh rate of a display screen, reducing picture quality, reducing backlight brightness, reducing a frequency of a processor, reducing a load of the first electronic component, reducing power of the first electronic component, or lowering a volume.

In a possible implementation of the first aspect, the method further includes: when the target temperature value falls within a first range, the target processing including M processing types; and when the target processing falls within a second range, the target processing including N processing types, where a maximum value of the first range is less than a minimum value of the second range, and M is less than N; or a maximum value of the first range is less than a minimum value of the second range, the M processing types are the same as the N processing types, and a processing granularity of at least one of the N processing types is greater than a processing granularity of a corresponding processing type in the M processing types; and M and N are positive integers.

In this design manner, when the target temperature value falls within the first range, the target processing includes M processing types; and when the target processing falls within the second range, the target processing includes N processing types. Because the maximum value of the first range is less than the minimum value of the second range, that is, when the target temperature value falls within the first range, the target temperature value is relatively low; and when the target temperature value falls within the second range, the target temperature value is relatively high. In this case, M is less than N, that is, when the target temperature value is relatively low, a quantity of processing types included in the target processing is relatively small, thereby helping to reduce the device power consumption: or in a case that the M processing types are the same as the N processing types, and a processing granularity of at least one of the N processing types is greater than a processing granularity of a corresponding processing type in the M processing types, that is, when the target temperature value is relatively high, a processing granularity of at least one of the N processing types is greater than a processing granularity of a corresponding processing type in the M processing types, thereby helping to further eliminate the electric leakage of the first electronic component.

In a possible implementation of the first aspect, the method further includes: displaying, by the electronic device, indication information when a quantity of times for which the electronic device has performed the target processing on the first electronic component is greater than or equal to a first preset quantity of times, and the electronic device has not eliminated the leakage of the first electronic component, where the indication information is used for prompting a user that the electronic device does not support continuing to execute the target task: or the indication information is used for prompting a user whether to end the target task.

In this design manner, when a quantity of times for which the electronic device has performed the target processing on the first electronic component is greater than or equal to a first preset quantity of times, and the electronic device has not eliminated the electric leakage of the first electronic component, the electronic device displays indication information. The indication information is used for prompting a user that the electronic device does not support continuing to execute the target task: or the indication information is used for prompting a user whether to end the target task. In this way, the user can determine, according to the indication information, that the electronic device fails, thereby improving the user experience.

In a possible implementation of the first aspect, the method further includes: displaying, by the electronic device, indication information when the target temperature reference value is greater than or equal to a second threshold, where the indication information is used for prompting a user that the electronic device does not support continuing to execute the target task: or the indication information is used for prompting a user whether to end the target task.

In this design manner, when the target temperature reference value is greater than or equal to the second threshold, the electronic device displays indication information; and when the target temperature reference value is larger, if the target temperature value is still greater than the target temperature reference value, the electronic device determines that the first electronic component certainly have an electric leakage problem, and the electric leakage of the first electronic component is relatively serious. In this case, the electronic device prompts the user that the electronic device fails through the indication information, thereby improving the user experience.

In a possible implementation of the first aspect, the method further includes: ending, by the electronic device, the target task in response to a confirmation operation of the user: or continuing, by the electronic device in response to a cancel operation of the user, to execute the target task.

In this design manner, the electronic device ends the target task in response to a confirmation operation of the user: or the electronic device continues, in response to a cancel operation of the user, to execute the target task. That is, the user can confirm, according to the indication information, whether to end the target task or continue to execute the target task, thereby helping to further improve the user experience.

In a possible implementation of the first aspect, the method further includes: automatically ending, by the electronic device, the target task when a quantity of times of the cancel operations of the user is greater than or equal to a second preset quantity of times: or automatically shutting down by the electronic device when a quantity of times of the cancel operations of the user is greater than or equal to a second preset quantity of times.

In this design manner, when a quantity of times of the cancel operations of the user is greater than or equal to a second preset quantity of times, the electronic device automatically ends the target task, or the electronic device automatically shuts down, so as to avoid unsafe problems caused by the electric leakage of the first electronic component, thereby helping to keep the user in safety.

According to a second aspect, an electronic device is provided. The electronic device has a function of implementing the foregoing first aspect. The function can be implemented by hardware, and may also be implemented by hardware executing corresponding software. The hardware or software includes one or more modules corresponding to the functions.

According to a third aspect, an electronic device is provided. The electronic device includes a plurality of first electronic components and a plurality of second electronic components, where the second electronic components are configured to detect temperatures of the first electronic components: the plurality of first electronic components include a display screen, a memory, and one or more processors: the display screen, the memory, and the one or more processors are coupled: the memory is configured to store computer program code and temperature distribution information of each of the first electronic components, and the temperature distribution information is used for indicating a plurality of temperature reference values at different positions on the first electronic component when the electronic device executes a target task: the computer program code includes computer instructions; and when the processor executes the computer instructions, the electronic device is enabled to perform the following steps: acquiring, by the electronic device when the electronic device executes the target task, a target temperature value at a target position on the first electronic component measured by a target temperature sensor, where the target temperature sensor is one of the plurality of second electronic components: determining, by the electronic device, a target temperature reference value corresponding to the target position from the temperature distribution information of the first electronic component; and determining, by the electronic device when a difference value between the target temperature value and the target temperature reference value is greater than or equal to a first threshold, that the first electronic component leaks electricity.

In a possible implementation of the third aspect, the temperature distribution information is a temperature contour map, the temperature contour map includes a plurality of closed curves, and temperature reference values on a same closed curve are the same; and when the processor executes the computer instructions, the electronic device is enabled to specifically perform the following steps: when the target position is located between two adjacent closed curves, the target temperature reference value being a temperature reference value on a closed curve in the two adjacent closed curves that is close to the target position: or determining, by the electronic device when the target position is located between two adjacent closed curves, the target temperature reference value according to temperature reference values on the two adjacent closed curves: or when the target position coincides with a closed curve, the target temperature reference value being a temperature reference value on the closed curve.

In a possible implementation of the third aspect, the temperature contour map is established after the electronic device pre-executes the target task at least once under normal circumstances.

In a possible implementation of the third aspect, when the processor executes the computer instructions, the electronic device is enabled to further perform the following steps: performing, by the electronic device, target processing on the first electronic component when the electronic device determines that the first electronic component leaks electricity, where the target processing is used for eliminating leakage of the electronic component.

In a possible implementation of the third aspect, the target processing includes one or more processing types of: reducing a refresh rate of a display screen, reducing picture quality, reducing backlight brightness, reducing a frequency of a processor, reducing a load of the first electronic component, reducing power of the first electronic component, or lowering a volume.

In a possible implementation of the third aspect, when the processor executes the computer instructions, the electronic device is enabled to further perform the following steps: when the target temperature value falls within a first range, the target processing including M processing types; and when the target processing falls within a second range, the target processing including N processing types, where a maximum value of the first range is less than a minimum value of the second range, and M is less than N: or a maximum value of the first range is less than a minimum value of the second range, the M processing types are the same as the N processing types, and a processing granularity of at least one of the N processing types is greater than a processing granularity of a corresponding processing type in the M processing types; and M and N are positive integers.

In a possible implementation of the third aspect, when the processor executes the computer instructions, the electronic device is enabled to further perform the following steps: displaying, by the electronic device, indication information when a quantity of times for which the electronic device has performed the target processing on the first electronic component is greater than or equal to a first preset quantity of times, and the electronic device has not eliminated the leakage of the first electronic component, where the indication information is used for prompting a user that the electronic device does not support continuing to execute the target task: or the indication information is used for prompting a user whether to end the target task.

In a possible implementation of the third aspect, when the processor executes the computer instructions, the electronic device is enabled to further perform the following steps: displaying, by the electronic device, indication information when the target temperature reference value is greater than or equal to a second threshold, where the indication information is used for prompting a user that the electronic device does not support continuing to execute the target task: or the indication information is used for prompting a user whether to end the target task.

In a possible implementation of the third aspect, when the processor executes the computer instructions, the electronic device is enabled to further perform the following steps:

ending, by the electronic device, the target task in response to a confirmation operation of the user: or continuing, by the electronic device in response to a cancel operation of the user, to execute the target task.

In a possible implementation of the third aspect, when the processor executes the computer instructions, the electronic device is enabled to further perform the following steps: automatically ending, by the electronic device, the target task when a quantity of times of the cancel operations of the user is greater than or equal to a second preset quantity of times: or automatically shutting down by the electronic device when a quantity of times of the cancel operations of the user is greater than or equal to a second preset quantity of times.

According to a fourth aspect, a computer-readable storage medium is provided. The computer-readable storage medium stores computer instructions, and when the computer instructions are run on a computer, the computer is enabled to perform the electric leakage detection method for an electronic component according to any one of implementations of the first aspect.

According to a fifth aspect, a computer program product including instructions is provided, and when the instructions are run on a computer, the computer is enabled to perform the electric leakage detection method for an electronic component according to any one of implementations of the first aspect.

For the technical effects brought by any one of the design manners in the second aspect to the fourth aspect, reference may be made to the technical effects brought by different design manners in the first aspect, and details are not described herein again.

DESCRIPTION OF EMBODIMENTS

Technical solutions in embodiments of this application are described below with reference to the accompanying drawings in the embodiments of this application. In the descriptions of this application, unless otherwise specified, the character "/" indicates an "or" relationship between associated objects. For example, A/B may represent A or B. The term "and/or" in this application is only an association for describing associated objects and represents that three relationships may exist. For example, A and/or B may represent the following three cases: Only A exists, both A and B exist, and only B exists, where A and B may be in a singular or plural form. In addition, in the descriptions of this application, "a plurality of" means two or more than two unless otherwise specified. "At least one of the following" or a similar expression thereof indicates any combination of these items, including a single item or any combination of a plurality of items. For example, at least one of a, b, or c may represent a, b, c, "a and b", "a and c", "b and c", or "a, b, and c", where a, b, and c may be singular or plural. In addition, to clearly describe the technical solutions of the embodiments of this application, in the embodiments of this application, words such as "first" and "second" are used to distinguish the same or similar items with functions and effects that are basically the same. Those skilled in the art may understand that the words "first", "second" and the like do not limit the quantity and execution order, and the words "first", "second" and the like are not limited to be necessarily different. Moreover, in the embodiments of this application, terms such as "illustrative" and "for example" are used for presenting an example, an instance, or an illustration. Any embodiment or design scheme described as "exemplary" or "for example" in the embodiments of this application should not be explained as being more preferable or having more advantages than other embodiments or design schemes. To be precise, the terms such as "illustrative" and "for example" are intended to present a related concept in a specific manner to facilitate understanding.

An embodiment of this application provides an electric leakage detection method for an electronic component, and the method is applied to an electronic device. The electronic device may be a mobile phone, a GoPro (GoPro), a digital camera, a tablet computer, a desktop computer, a laptop computer, a handheld computer, a notebook computer, an in-vehicle device, an ultra-mobile personal computer (ultra-mobile personal computer, UMPC), a netbook, a cellular phone, a personal digital assistant (personal digital assistant, PDA), an augmented reality (augmented reality, AR)\virtual reality (virtual reality, VR) device, or the like. A specific form of the electronic device is not particularly limited in the embodiments of this application.

Figure 1:
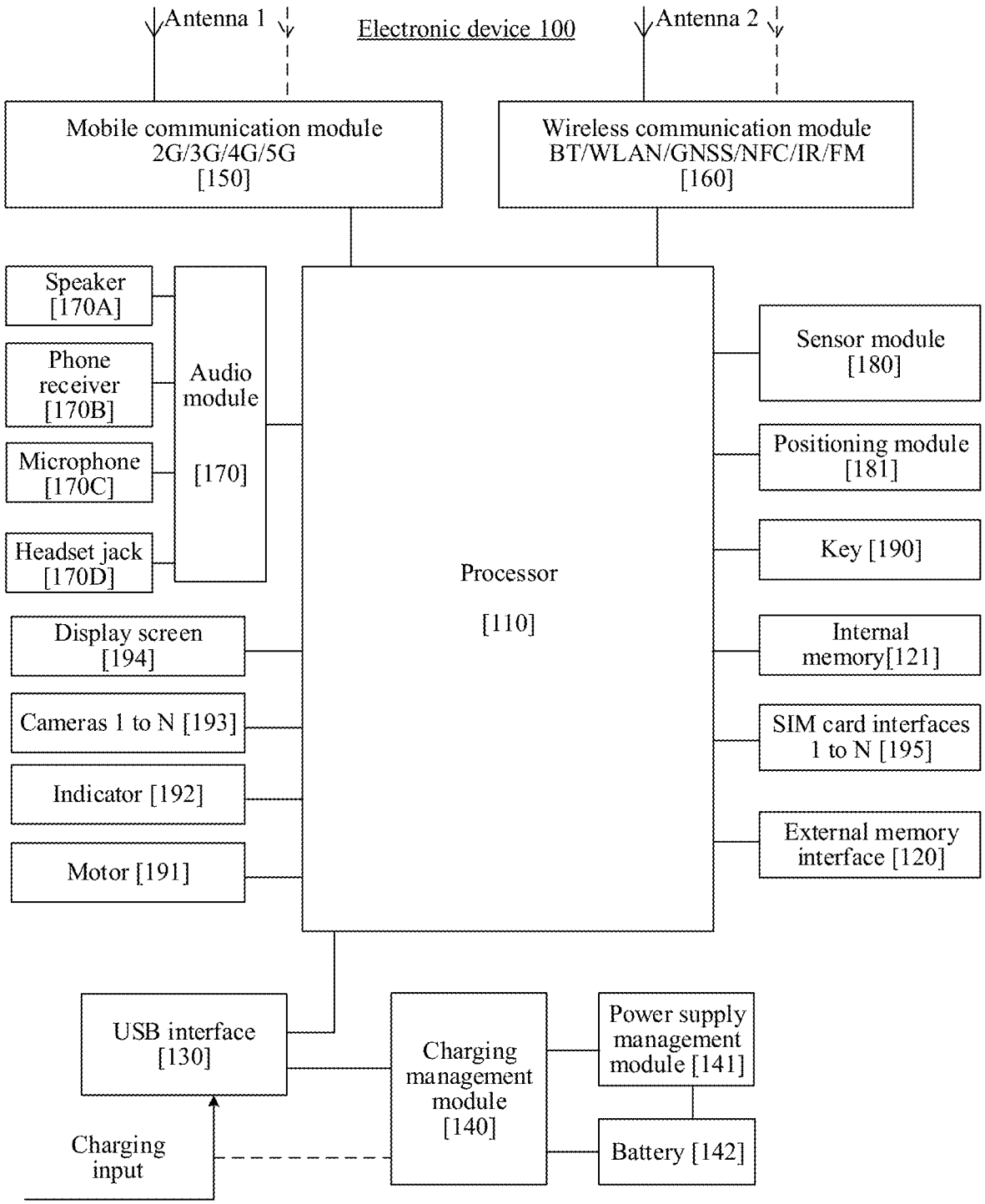
FIG. 1 is a schematic diagram of a hardware structure of an electronic device according to an embodiment of this application.

FIG. 1 is a schematic diagram of a hardware structure of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, and an audio module 170, a speaker 170A, a phone receiver 170B, a microphone 170C, a headset jack 170D, a sensor module 180, a key 190, a motor 191, an indicator 192, a camera 193, a display screen 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that, the structure shown in this embodiment does not constitute a specific limitation on the electronic device 100. In some other embodiments, the electronic device 100 may include more or fewer components than those shown in the figure, or some components may be combined, or some components may be split, or a different component deployment may be used. The components in the portrait may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU), and the like. Different processing units may be separate devices, or may be integrated into one or more processors.

The controller may be a nerve center and a command center of the electronic device 100. The controller may generate an operation control signal according to instruction operation code and a time-sequence signal, and control obtaining and executing of instructions.

A memory may also be disposed in the processor 110, configured to store instructions and data. In some embodiments, the memory in the processor 110 is a cache. The memory may store an instruction or data that has just been used or cyclically used by the processor 110. If the processor 110 needs to use the instruction or the data again, the processor may directly invoke the instruction or the data from the memory, to avoid repeated access and reduce a waiting time of the processor 110, thereby improving system efficiency.

In some embodiments, the processor 110 may include one or more interfaces. The interface may include an integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that, an interface connection relationship between modules shown in this embodiment is merely a schematic description, and does not limit a structure of the electronic device. In some other embodiments, the electronic device may alternatively use an interface connection manner different from that in the foregoing embodiment, or use a combination of a plurality of interface connection manners.

The charging management module 140 is configured to receive charging input from the charger. The charger may be a wireless charger, or may be a wired charger. In some embodiments of wired charging, the charging management module 140 may receive a charging input of a wired charger by using the USB interface 130. In some embodiments of wireless charging, the charging management module 140 may receive a wireless charging input through a wireless charging coil of the electronic device. The charging management module 140 may supply power for the electronic device by using the power management unit 141 while charging the battery 142.

The power management module 141 is configured to be connected to the battery 142, the charging management module 140, and the processor 110. The power management module 141 receives an input of the battery 142 and/or the charging management module 140, to supply power to the processor 110, the internal memory 121, an external memory, a display screen 194, the camera 193, the wireless communication module 160, and the like. The power management module 141 may be further configured to monitor parameters such as a battery capacity, a quantity of battery cycles, and a battery health status (electric leakage and impedance). In some other embodiments, the power supply management module 141 may alternatively be disposed in the processor 110. In some other embodiments, the power management module 141 and the charging management module 140 may be alternatively disposed in a same device.

The wireless communication function of the electronic device 100 can be implemented by the antenna 1, the antenna 2, the mobile communication module 150, the wireless communication module 160, the modem processor, the baseband processor, and the like.

The electronic device 100 implements a display function by using the GPU, the display screen 194, the application processor, and the like. The GPU is a microprocessor for image processing, and is connected to the display screen 194 and the application processor. The GPU is configured to perform mathematical and geometric calculation, and is configured to render an image. The processor 110 may include one or more GPUs that execute a program instruction to generate or change display information.

The display screen 194 is configured to display an image, a video, and the like. The display screen 194 includes a display panel (or referred to as a display substrate). The display panel may be an organic light-emitting diode (organic light-emitting diode, OLED). In the embodiments of this application, the display screen is an LTPO display screen; and a display unit (for example, a TFT) in the display panel included in the LTPO display screen is an LTPO TFT. For examples and descriptions of LTPO, reference may be made to the foregoing embodiments, and details will not be repeated one by one herein again.

The electronic device 100 can implement a photographing function through the ISP, the camera 193, the video codec, the GPU, the display screen 194, the application processor, and the like.

The ISP is configured to process data fed back by the camera 193. For example, during photographing, a shutter is enabled. Light is transmitted to a photosensitive element of the camera through a lens, and an optical signal is converted into an electrical signal. The photosensitive element of the camera transmits the electrical signal to the ISP for processing, and the electrical signal is converted into an image visible to a naked eye. The ISP may alternatively perform algorithm optimization on noise, luminance, and complexion of the image. The ISP may further optimize parameters such as exposure and a color temperature of a photographing scene. In some embodiments, the ISP may be arranged in the camera 193.

The camera 193 is configured to capture a static image or a video. An optical image is generated for an object by using the lens and is projected onto the photosensitive element. The photosensitive element may be a charge-coupled device (charge coupled device, CCD) or a complementary metal-oxide-semiconductor (complementary metal-oxide-semi-conductor, CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into a standard image signal in an RGB format, a YUV format, or the like. In some embodiments, the electronic device may include one or N cameras 193, and N is a positive integer greater than 1.

The digital signal processor is configured to process a digital signal, and in addition a digital image signal, the digital signal processor may also process other digital signals. For example, when the electronic device performs frequency selection, the digital signal processor is configured to perform Fourier transform and the like on frequency energy.

The video codec is configured to compress or decompress a digital video. The electronic device 100 may support one or more video codecs. In this way, the electronic device may play or record videos in a plurality of encoding formats, for example, moving picture experts group (moving picture experts group, MPEG) 1, MPEG 2, MPEG 3, and MPEG 4.

The NPU is a neural-network (neural-network, NN) computing processor, quickly processes input information by referring to a structure of a biological neural network, for example, a transmission mode between neurons in a human brain, and may further continuously perform self-learning. Applications such as intelligent cognition of the electronic device may be implemented by using the NPU, for example, image recognition, facial recognition, voice recognition, and text understanding.

The electronic device 100 may implement an audio function by using the audio module 170, the speaker 170A, the phone receiver 170B, the microphone 170C, the headset jack 170D, the application processor, and the like. The audio function is, for example, music play back and sound recording.

The audio module 170 is configured to convert digital audio information into analog audio signal output, and is also configured to convert analog audio input into a digital audio signal. The audio module 170 may further be configured to encode and decode audio signals. In some embodiments, the audio module 170 may be disposed in the processor 110, or some functional modules of the audio module 170 are disposed in the processor 110. The speaker 170A, also referred to as a "speaker", is configured to convert an audio electrical signal into a sound signal. The phone receiver 170B, also referred to as a "handset", is configured to convert an audio electrical signal into a sound signal. The microphone 170C, also referred to as a "microphone" or a "megaphone", is configured to convert a sound signal into an electrical signal.

The headset jack 170D is configured to be connected to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The external memory interface 120 may be configured to connect to an external storage card, for example, a micro SD card, to expand a storage capability of the electronic device. The external storage card communicates with the processor 110 through the external memory interface 120, to implement a data storage function, for example, storing a file such as audio or a video in the external storage card.

The internal memory 121 may be configured to store computer-executable program code. The executable program code includes an instruction. The processor 110 runs the instruction stored in the internal memory 121, to perform various function applications and data processing of the electronic device. For example, in this embodiment of this application, the processor 110 may execute instructions stored in the internal memory 121, and the internal memory 121 may include a program storage area and a data storage area.

The program storage area may store an operating system, an application required by at least one function (such as a voice playing function and an image playing function), and the like. The data storage region may store data (for example, audio data and an address book) created during use of the electronic device. In addition, the internal memory 121 may include a high-speed random access memory, and may also include a non-volatile memory, for example, at least one magnetic disk storage device, a flash memory device, or a universal flash storage (universal flash storage, UFS).

The key 190 includes a start key, a volume key, and the like. The key 190 may be a mechanical key, or a touch-type key. The motor 191 may generate a vibration prompt. The motor 191 may be used for an incoming call vibration prompt and a touch vibration feedback. The indicator 192 may be an indicator light that may be configured to indicate a charging state and a power change, or may be configured to indicate a message, a missed call, a notification, and the like. The SIM card interface 195 is configured to connect to a SIM card. The SIM card may be inserted into the SIM card interface 195 or plugged from the SIM card interface 195, to come into contact with or be separated from the electronic device. The electronic device may support one or N SIM card interfaces. N is a positive integer greater than 1. The SIM card interface 195 may support a Nano-SIM card, a Micro-SIM card, a SIM card, and the like.

In some embodiments, a software system of the electronic device 100 may use a layered architecture, an event-driven architecture, a microkernel architecture, a micro service architecture, or a cloud architecture. In this embodiment of the present invention, an Android system with a layered architecture is used as an example to illustrate a software architecture of the electronic device 100.

Figure 2:
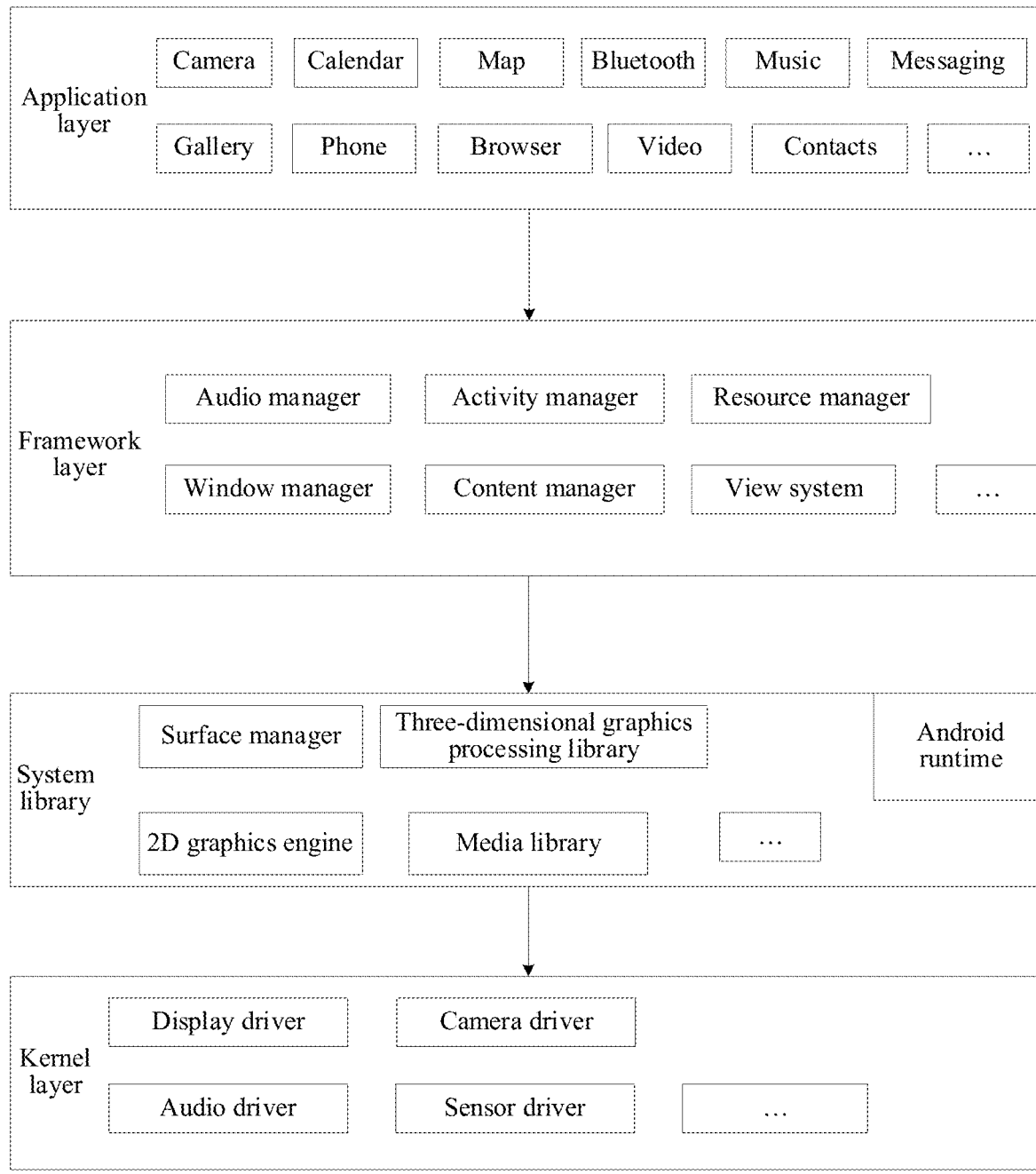
FIG. 2 is a schematic diagram of a software framework of an electronic device according to an embodiment of this application.

FIG. 2 is a block diagram of a software structure of the electronic device 100 according to an embodiment of this application.

In the layered architecture, the software is divided into several layers, and each layer has a clear role and task. The layers communicate with each other by using a software interface. In some embodiments, the Android system is divided into four layers that are respectively an application layer, an application framework layer, an Android runtime (Android runtime) and system library, and a kernel layer from top to bottom.

The application layer may include a series of application packages.

As shown in FIG. 2, the application packages may include applications such as camera, gallery, calendar, phone, map, navigation, WLAN, Bluetooth, music, video, messaging, and voice assistant.

The application framework layer provides an application programming interface (application programming interface, API) and a programming framework for an application on the application layer. The application framework layer includes some predefined functions.

As shown in FIG. 2, the application framework layer may include a window manager, a content provider, a view system, a phone manager, a resource manager, a notification manager, and the like.

The window manager is configured to manage a window application. The window manager may acquire a size of a display screen, determine whether there is a status bar, lock a screen, capture a screen, and the like.

The content provider is configured to store and acquire data and make the data accessible to an application. The data may include a video, an image, an audio, calls that are made and received, a browsing history and bookmarks, an address book, and the like.

The view system includes a visual control such as a control for text display or a control for picture display. The view system may be configured to construct an application. A display interface may include one or more views. For example, a display interface including an SMS notification icon may include a view for displaying text and a view for displaying a picture.

The phone manager is configured to provide communication functions of an electronic device 100, for example, call state management (including getting through, hang-up, and the like).

The resource manager provides various resources such as a localized character, an icon, a picture, a layout file, and a video file for an application.

The notification manager enables an application to display notification information on a status bar. The notification information may be a message used to indicate a notification type, and may automatically disappear after a short stay without interacting with a user. For example, the notification manager is configured to notify download completion, a message prompt, and the like. The notification manager may alternatively be a notification that appears on a top status bar of the system in the form of a graph or a scroll bar text, for example, a notification of an application running on the background, or may be a notification that appears on the screen in the form of a dialog window. For example, text information is prompted on a status bar, a prompt tone is made, the electronic device vibrates, or an indicator light flashes.

The Android Runtime includes a core library and a virtual machine. The Android Runtime is responsible for scheduling and management of the Android system.

The core library includes two parts: one part is a performance function that the Java language needs to invoke, and the other part is a core library of Android.

The application layer and the application framework layer are run in the virtual machine. The virtual machine executes java files of the application layer and the application framework layer as binary files. The virtual machine is configured to execute functions such as object lifecycle management, stack management, thread management, security and exception management, and garbage collection.

The system library may include a plurality of function modules, for example, a surface manager (surface manager), a media library (media libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio coding formats, such as MPEG4, H.264, MP3, AAC, AMR, JPG, and PNG.

The three-dimensional graphics processing library is configured to implement three-dimensional graphics drawing, image rendering, synthesis, layer processing, and the like.

The 2D graphics engine is a drawing engine for 2D graphics.

The kernel layer is a layer between hardware and software. The kernel layer includes at least a display driver, a camera driver, an audio driver, and a sensor driver.

For ease of understanding, related technologies related to the embodiments of this application are first described.

At present, in the production process of the electronic device, due to some reasons (such as improper software control or hardware failure), an electronic component integrated inside the electronic device (or referred to as a first electronic component) may have an electric leakage problem. Based on this, in the related art, the electronic device generally detects electric leakage of electronic components integrated inside the electronic device in the following two cases. In one case, electric leakage detection of electronic components will be performed before the electronic device leaves the factory. In another case, in a process in which a user uses the electronic device, if the user finds that the electronic device is abnormal (such as fast power consumption or an excessively high temperature of the electronic device) during operation, the user will feed the abnormal problem back to the manufacturer of the electronic device, so that the manufacturer performs electric leakage detection on the electronic components integrated inside the electronic device for the abnormal problem.

Electric leakage refers to current leakage (which may also be referred to as a leakage current for short) of an electronic component due to a failure thereof or other reasons such as improper software control.

It is to be noted that, the electronic component is a conductor, and when a current passes through the conductor, the conductor will generate heat. This heat generated by the current is referred to as electric heat, so that the electronic component may also be referred to as an electric heating element. In some embodiments, the electric heat is related to the current passing through the electronic component and the resistance (or referred to as impedance) of the electronic component. For example, a relationship between the electric heat, the current, and the resistance satisfies the following formula: $Q=I^2 \times R \times t$, where Q is the electric heat (the unit is: V·A·S), I is the current (the unit is: A), R is the resistance (the unit is: Ω), and t is time (the unit is: S).

It can be seen from the foregoing formula that the resistance of the electronic component is a certain value, and when the current flowing through the electronic component is a certain value, a magnitude of the electric heat is proportional to the time. For example, when the electronic component is operating (that is, a current flows through the electronic component), the generated electric heat increases with time. However, when the electronic component has an electric leakage problem, that is, the electronic component has a current leakage, this will cause an increase in the current flowing through the electronic component, so that the electric heat generated by the electronic component will increase. In other words, the same electronic component works for the same time (that is, the time t is equal), and when the electronic component is normal (that is, has no electric leakage problem), the current flowing through the electronic component is a certain value, and the generated electric heat is Q1. When the electronic component is abnormal (that is, has an electric leakage problem), the current flowing through the electronic component will increase, and the generated electric heat is Q2. In a case that the same electronic component works for the same time, when the electronic component has an electric leakage problem, because the current flowing through the electronic component increases, the electric heat generated by the electronic component increases, that is, Q2 is greater than Q1.

It is to be noted that, because generation of the electric heat is the process of converting electric energy into heat energy when the current passes through an electronic component, when the current passes through the electronic component, the electronic component will generate heat, that is, the temperature of the electronic component will increase. In addition, because the electric heat generated by an abnormal (that is, having an electric leakage problem) electronic component is greater than the electric heat generated by a normal (that is, having no electric leakage) electronic component, when the same electronic component works for the same time, the temperature of the electronic component with electric leakage will be higher than the temperature of the electronic component without electric leakage.

Figure 3:
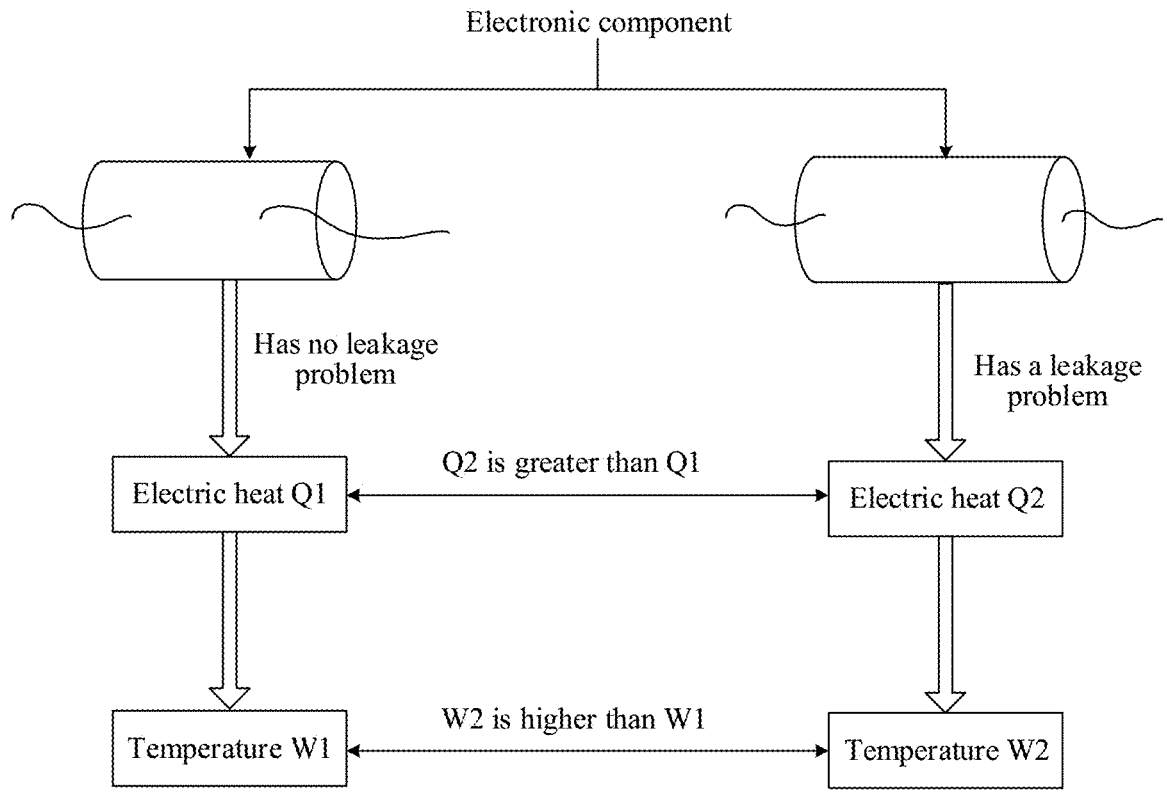
FIG. 3 is a schematic diagram of a comparison of a temperature when an electronic device is normal and a temperature when the electronic device is abnormal according to an embodiment of this application.

For example, as shown in FIG. 3, in a case that the electronic component is normal (that is, has no electric leakage), the electric heat generated by the electronic component is Q1 when an operating time is t1; and in a case that the electronic component is abnormal (that is, has electric leakage), the electric heat generated by the electronic component is Q2 when an operating time is t1. When the electric heat generated by the electronic component is Q1, the temperature of the electronic component is W1; when the electric heat generated by the electronic component is Q2, the temperature of the electronic component is W2. Based on the foregoing embodiment, it can be learned that Q2 is greater than Q1, so that W2 is also greater than W1, that is, the temperature of the electronic component with electric leakage during operation is higher than the temperature of the electronic component without electric leakage during operation.

Based on this, the embodiments of this application provide an electric leakage detection method for an electronic component, applied to an electronic device. By using this method, an electronic component (or referred to as a first electronic component) that causes an electric leakage problem can be intelligently identified without dismantling parts or destroying the hardware structure of the electronic device. For example, by using the method, the temperature of each electronic component among the plurality of electronic components integrated inside the electronic device when the electronic device executes a task can be detected, and the temperature of each electronic component (or referred to as a target temperature value) is compared with a preset temperature value (or referred to as a target temperature reference value), and an electronic component of which the temperature is higher than the preset temperature value is the electronic component that has the electric leakage problem. In this way, not only the time and manpower required for detecting electric leakage of electronic components are saved, but also the detection efficiency is improved.

In some embodiments, when a difference value between a temperature of an electronic component and the preset temperature value is greater than or equal to a first threshold, the electronic device determines that the electronic component leaks electricity. It is to be noted that, the first threshold may be set according to specific needs, and the first threshold is not limited in this embodiment of this application. In some embodiments, the first threshold is, for example, equal to zero, that is, the temperature of the electronic component is equal to the preset temperature value.

It is to be noted that, the electronic component in the embodiments of this application may be a unit with the smallest granularity in the electronic device that can independently play a role of conversion control, or it may be a unit obtained by assembling a plurality of components. In some embodiments, the plurality of electronic components may include, for example, a display screen (or referred to as a screen), a central processing unit (central processing unit, CPU), an audio amplifier (SmartPA), a modem (modem), and the like. The audio amplifier may also be referred to as an intelligent power amplifier. It is to be noted that, the plurality of electronic components may also include other hardware structures or components of the electronic device, which will not be listed one by one herein again. For examples and descriptions of other electronic components, reference may be made to each hardware in the hardware structure of the electronic device shown in FIG. 2 in the foregoing embodiments.

The following describes technical solutions provided in the embodiments of this application in detail with reference to the accompanying drawings in the specification.

In some embodiments, the plurality of electronic components may be integrated on a main board of the electronic device. The main board is one of the most basic and most important components of the electronic device; and the main board may also be referred to as a mainboard (mainboard), a systemboard (systemboard), or a motherboard (motherboard). For example, as shown in FIG. 4, a main board 200 may include electronic components such as a processor, a fast charging chip, a flash memory, a Bluetooth chip, an audio amplifier, and a power amplifier.

It should be understood that, when a current passes through an electronic component, the electronic component will generate heat, that is, the temperature of the electronic component will increase. In some embodiments, by scanning an infrared thermal image of the electronic components, temperatures of the plurality of electronic components integrated inside the electronic device can be intuitively seen, and these temperatures will be intuitively displayed through the infrared thermal image. For example, an infrared thermal image may be obtained by scanning the electronic components with an infrared thermal imager. The infrared thermal imager uses an infrared detector, an optical imaging objective lens, and an optical-mechanical scanning system to receive an infrared radiation energy distribution pattern of the electronic components and reflect it on a photosensitive element of the infrared detector, and between the optical system and the infrared detector, an optical-mechanical scanning mechanism scans the infrared thermal image of the electronic components and focuses it on a unit or a spectroscopic detector. The detector converts the infrared radiation energy into an electrical signal, and an infrared thermal image is displayed through a TV screen or the detector after amplification, conversion or through a standard video signal.

Figure 4:
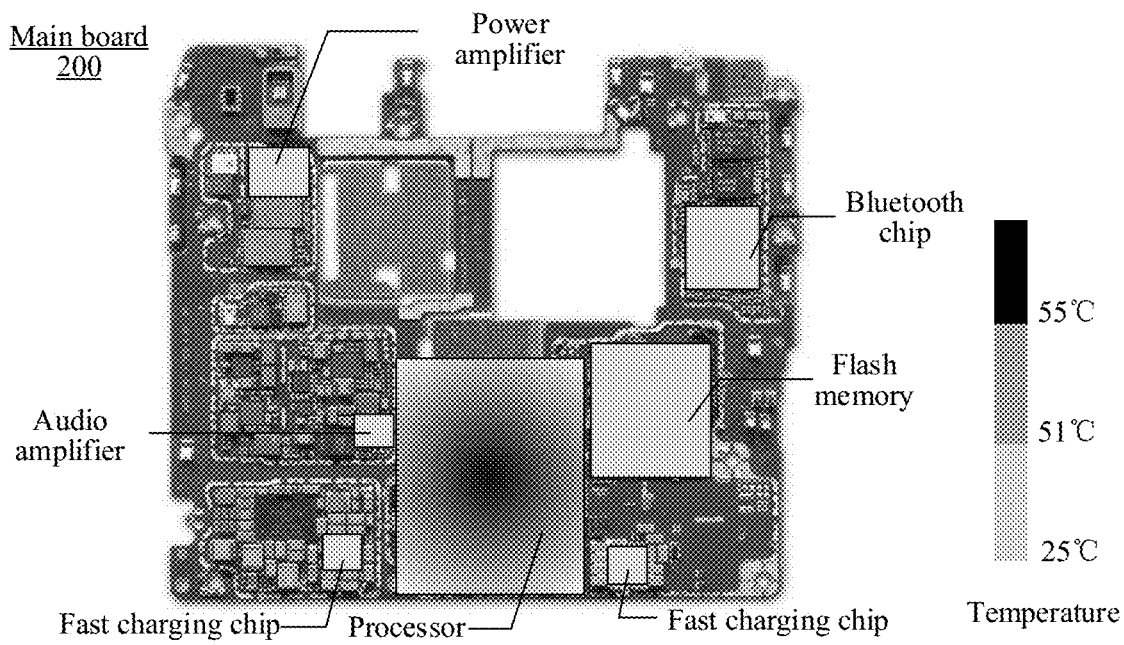
FIG. 4 is a schematic structural diagram of a main board of an electronic device according to an embodiment of this application.

Still as shown in FIG. 4, after infrared thermal imaging scanning is performed on the main board 200, temperatures of the electronic components (such as a processor, a fast charging chip, a flash memory, a Bluetooth chip, an audio amplifier, and a power amplifier) can be seen. It can be seen from FIG. 4 that the temperature of the electronic component (for example, a processor) gradually decreases from the inside to the outside. That is, around the processor, the temperature at a position closer to the processor is higher, and conversely, the temperature at a position farther away from the processor is lower. For example, the temperature at the center position of the processor is the highest (for example, reaching 55° C.), while the temperature away from the center position of the processor decreases gradually (for example, decreasing from 55° C. to 25° C.).

In addition, it can still be seen from FIG. 4 that the temperatures of different electronic components are also different. For example, the highest temperature of the processor is the highest (for example, higher than 55° C.), while the temperatures of electronic components such as the fast charging chip, the flash memory, the Bluetooth chip, the audio amplifier, and the power amplifier are relatively low (for example, between 55° C. and 25° C.). This is because when the electronic device performs a task, the division of work of the plurality of electronic components in the working process is different, so that the temperature of each of the plurality of electronic components is different. The different division of work of the plurality of electronic components in the working process means that amounts of tasks undertaken by the plurality of electronic components are different in the working process. Therefore, the temperature of each of the plurality of electronic components is different. For example, in the main board 200 shown in FIG. 4, due to the different division of work of the electronic components such as a processor, a fast charging chip, a flash memory, a Bluetooth chip, an audio amplifier, and a power amplifier, that is, amounts of tasks undertaken by the electronic components such as a processor, a fast charging chip, a flash memory, a Bluetooth chip, an audio amplifier, and a power amplifier in the working process are different, resulting in different temperatures for these electronic components. For example, the processor undertakes a relatively large amount of tasks in the working process (for example, the processor mainly undertakes the algorithm part), so that the temperature of the processor is relatively high. However, the electronic components such as the fast charging chip, the flash memory, the Bluetooth chip, the audio amplifier, and the power amplifier undertake a relatively small amount of tasks in the working process (such as only undertaking the task of assisting the processor to run algorithms), so that these electronic components are relatively infrequently inquired. Based on this, when the main board 200 is scanned by the infrared thermal imager, different temperatures of the electronic components can be clearly seen in the presented infrared thermal image.

It is to be noted that, the amount of tasks undertaken by each of the plurality of electronic components in the working process will vary according to different tasks performed by the electronic device. When the task performed by the electronic device is different, the application scenario of the electronic device is also different. The application scenario of the electronic device refers to a scenario when a user uses the electronic device to realize a certain function. For example, when the user uses the electronic device to play a game, the application scenario may be, for example, a game scenario; and when the user uses the electronic device to play music, the application scenario may be, for example, an audio scenario. In some embodiments, the application scenario may also be referred to as a usage scenario. In addition, the above application scenario is only used as an example for description in the embodiments of this application, and does not constitute a limitation to this application. For example, the application scenario may alternatively be a video scenario, a browser scenario, and the like, which will not be listed one by one herein again.

Figure 5:
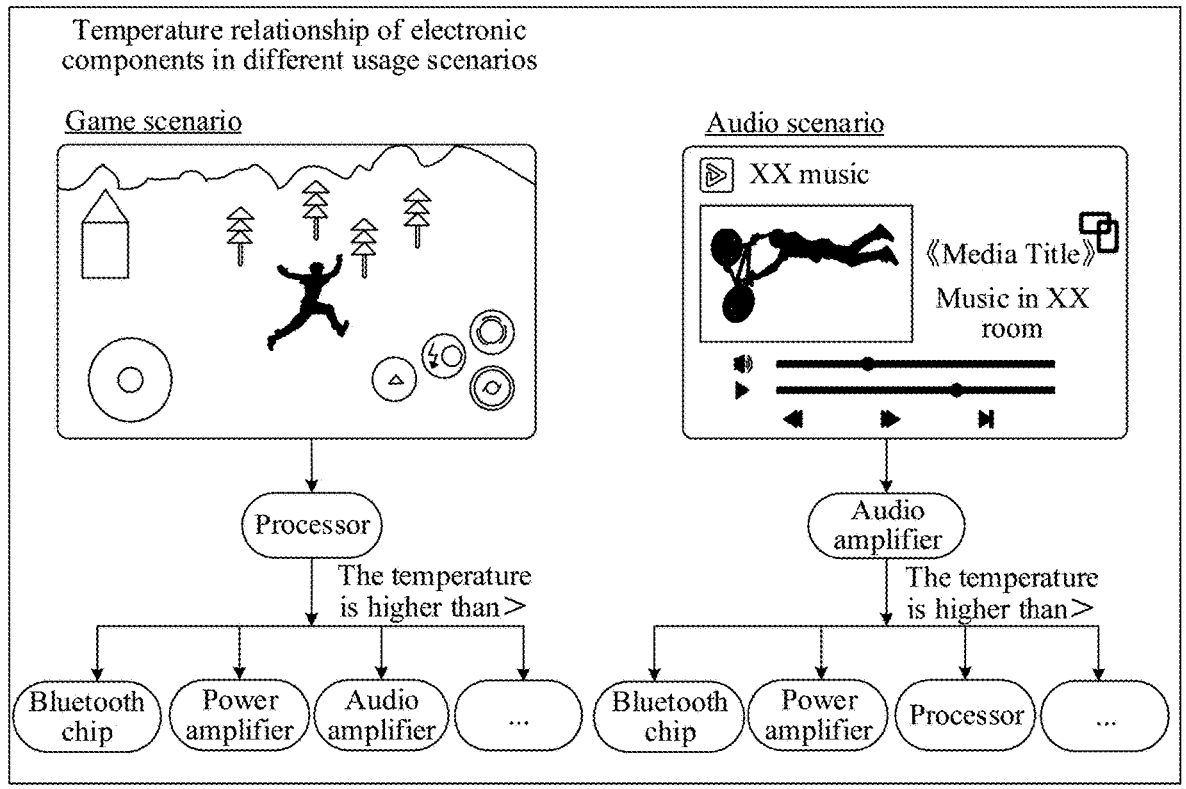
FIG. 5 is a schematic diagram of a comparison of temperatures of electronic components in different application scenarios according to an embodiment of this application.

Due to different division of work of the plurality of electronic components, the amounts of tasks undertaken by the plurality of electronic components in the working process are different, so that the temperatures of the plurality of electronic components will also be different. For example, as shown in FIG. 5, the application scenario is a game scenario, that is, the user uses the electronic device to play a game. In this case, the amount of tasks undertaken by the processor is larger than the amounts of tasks undertaken by other electronic components (such as the Bluetooth chip, the power amplifier, and the audio amplifier), so that the temperature of the processor will be higher than the temperatures of the other electronic components. When the application scenario is an audio scenario, that is, the user is uses the electronic device to play music, in this case, the amount of tasks undertaken by the audio amplifier is larger than the amounts of tasks undertaken by other electronic components (such as the Bluetooth chip, the power amplifier, and the processor), so that the temperature of the audio amplifier will be higher than the temperatures of the other electronic components.

It may be understood that, for the same electronic component, when the application scenario of the electronic device is different, the temperature of the electronic component is also different. An example in which the electronic component is a processor is used. For example, the temperature of the processor in a game scenario is higher than the temperature of the processor in an audio scenario. Based on this, in this embodiment of this application, when detecting the temperatures of the electronic components and comparing the temperatures of the electronic components with the preset temperature value to determine an electronic component having an electric leakage problem, the determining of the preset temperature value requires combination of different application scenarios of the electronic device. In other words, the preset temperature value mentioned in this embodiment of this application is determined based on different application scenarios.

In some embodiments, the preset temperature value is data obtained by developers after a plurality of experiments in the early stage of device debugging. For example, in the early stage of device debugging, the developers may simulate the user using the electronic device to execute different tasks (even if the electronic device is in different application scenarios), and obtain preset temperature values of electronic components in different application scenarios through collecting and summarizing.

For example, the developers may simulate the user using the electronic device to execute different tasks to simulate different application scenarios, and scan the electronic components in different application scenarios with an infrared thermal imager, to obtain an infrared thermal image of the electronic components in different application scenarios. In addition, the infrared thermal image of the electronic components is processed, to obtain temperatures at positions around each electronic component. In some embodiments, the developers may establish a temperature coordinate system for each electronic component in different scenarios based on the temperatures at various positions around each electronic component. Each coordinate in the temperature coordinate system is used for indicating one position around the electronic component. In addition, a number annotated on each coordinate is the temperature at the position. In some other embodiments, the developers may establish temperature contours (or referred to as a temperature contour map) for each electronic component in different scenarios based on the temperatures at various positions around each electronic component. The temperature contour refers to a curve formed by connecting adjacent points with the same temperature on the main board of the electronic device. Specifically, the curve formed by connecting the points with the same temperature on the main board surface is projected vertically onto a horizontal plane, and scaled down by drawing on a drawing sheet to obtain the temperature contour. Generally, this temperature contour can be formed as a closed curve. The temperature contour may also be regarded as an intersection line between horizontal planes of different heights and the actual main board surface, so that the temperature contour is a closed curve. In addition, the number annotated on the temperature contour is the temperature of the temperature contour.

In some embodiments, the temperature contour map is established after the electronic device pre-executes the target task at least once under normal circumstances. The electronic device under normal circumstances means that before (or after) the electronic device leaves the factory, the electronic components of the electronic device are detected by a specialized device, and after the detection is completed, it is determined that the electronic components in the electronic device are normal. In addition, that the electronic device pre-executes the target task at least once under normal circumstances means that: when it is determined that the electronic device is normal, before the electronic device leaves the factory, or before whether the electronic components integrated in the electronic device leak electricity is detected, simulation of the user for executing a target task at least once is performed.

Figure 6:
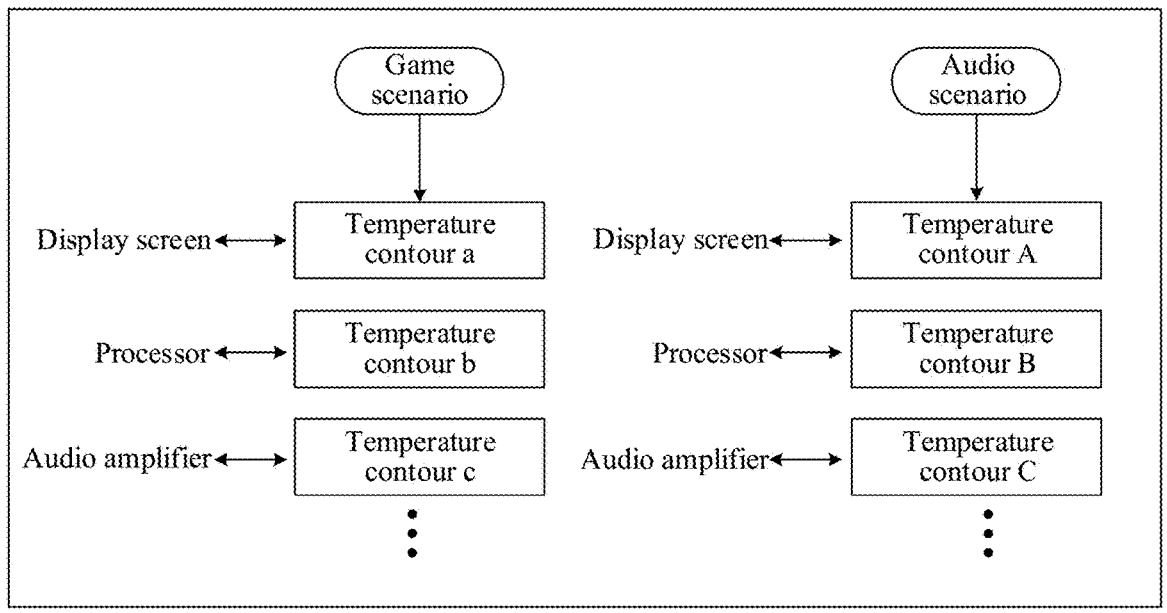
FIG. 6 is a schematic diagram of establishing temperature contours of electronic components in different application scenarios according to an embodiment of this application.

For example, as shown in FIG. 6, in a game scenario, the display screen is scanned by an infrared thermal imager, and a temperature contour (for example, a temperature contour a) of the display screen is established: the processor is scanned by the infrared thermal imager, and a temperature contour (for example, a temperature contour b) of the processor is established; and the audio amplifier is scanned by the infrared thermal imager, and a temperature contour (for example, a temperature contour c) of the audio amplifier is established. Still as shown in FIG. 6, in an audio scenario, the display screen is scanned by an infrared thermal imager, and a temperature contour (for example, a temperature contour A) of the display screen is established: the processor is scanned by the infrared thermal imager, and a temperature contour (for example, a temperature contour B) of the processor is established; and the audio amplifier is scanned by the infrared thermal imager, and a temperature contour (for example, a temperature contour C) of the audio amplifier is established.

It should be understood that, due to different application scenarios, the temperature contour corresponding to the same electronic component is not exactly the same. For example, the temperature contour a is not exactly the same as the temperature contour A: the temperature contour b is not completely the same as the temperature contour B; and the temperature contour c is not completely the same as the temperature contour C.

In order to more clearly and accurately detect an electronic component having an electric leakage problem, in some embodiments, the application scenarios described in the foregoing embodiments may be further subdivided. For example, the audio scenario may be subdivided into an audio scenario 1, an audio scenario 2, and an audio scenario 3 according to a volume when the user uses the electronic device to play audio. The audio scenario 1 may be, for example, that the volume when the user uses the electronic device to play audio is [0%, 35%]: the audio scenario 2 may be, for example, that the volume when the user uses the electronic device to play audio is [36%, 70%]; and the audio scenario 3 may be, for example, that the volume when the user uses the electronic device to play audio is [71%, 100%]. On this basis, each electronic component may be scanned by the infrared thermal imager in the audio scenario 1, the audio scenario 2, and the audio scenario 3 respectively, and a temperature contour of each electronic component may be established.

Correspondingly, the game scenario may be subdivided into a game scenario 1, a game scenario 2, and a game scenario 3 according to a game type when the user uses the electronic device to play a game. For example, the game scenario 1 may be, for example, a scenario in which the user uses the electronic device to play a casual game: the game scenario 2 may be, for example, a scenario in which the user uses the electronic device to play a simulation game; and the game scenario 3 may be, for example, a scenario in which the user uses the electronic device to play another type of game. On this basis, each electronic component may be scanned by the infrared thermal imager in the game scenario 1, the game scenario 2, and the game scenario 3 respectively, and a temperature contour of each electronic component may be established.

It is to be noted that, after the application scenario subdivided, for the specific implementations of establishing the temperature contours of the electronic components according to different application scenarios, reference may be made to the foregoing embodiments and the content shown in FIG. 6, which will not be repeated herein.

The establishment of the temperature contour of the audio amplifier in an audio scenario is used as an example for illustration. For example, when the audio amplifier is normal (that is, has no electric leakage), the temperature contour of the audio amplifier is shown in (a) of FIG. 7. When the audio amplifier is abnormal (that is, has electric leakage), the temperature contour of the audio amplifier is shown in (b) of FIG. 7. Referring to (a) of FIG. 7 and (b) of FIG. 7, the temperature contour is a closed curve, and the numbers annotated on the temperature contours are temperatures around the audio amplifier. It can be seen that the temperature at a position closer to the audio amplifier is higher, and conversely, the temperature at a position farther away from the audio amplifier is lower. In addition, comparing the temperature contours shown in (a) of FIG. 7 and (b) of FIG. 7, the temperature of the audio amplifier having electric leakage at the same position is significantly higher than the temperature of the audio amplifier having no electric leakage at the same position.

Figure 8:
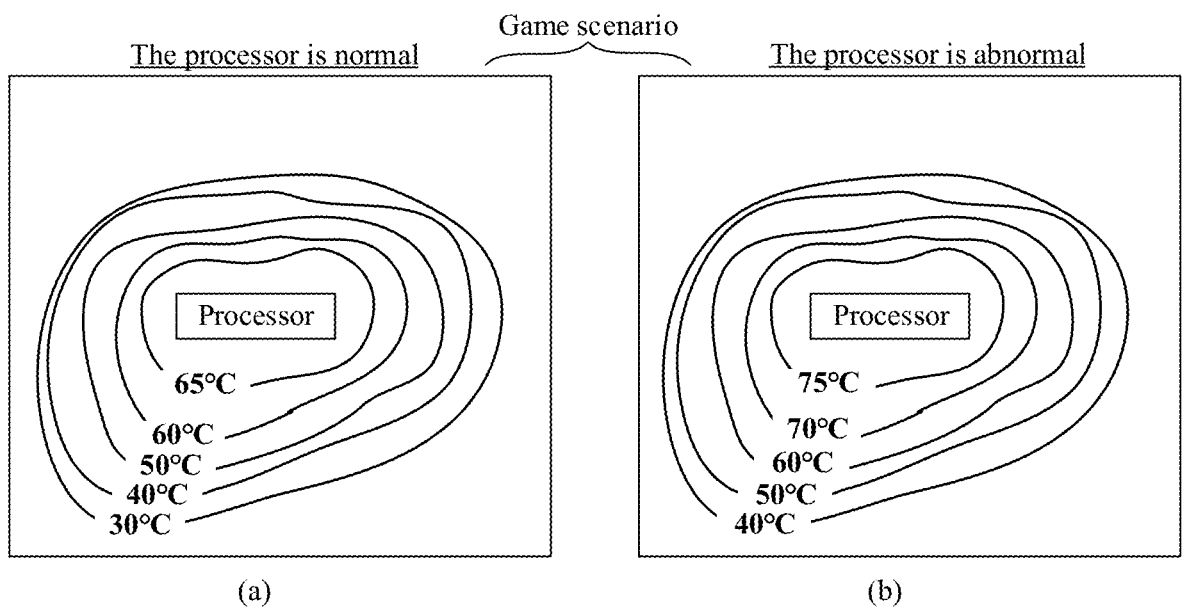
FIG. 8 is a schematic diagram of a temperature contour of a processor in a game scenario according to an embodiment of this application.

The establishment of the temperature contour of the processor in a game scenario is used as an example for illustration. For example, when the processor is normal (that is, has no electric leakage), the temperature contour of the processor is shown in (a) of FIG. 8. When the processor is abnormal (that is, has electric leakage), the temperature contour of the processor is shown in (b) of FIG. 8. Referring to (a) of FIG. 8 and (b) of FIG. 8, the temperature contour is a closed curve, and the numbers annotated on the temperature contours are temperatures around the processor. It can be seen that the temperature at a position closer to the processor is higher, and conversely, the temperature at a position farther away from the processor is lower. In addition, comparing the temperature contours shown in (a) of FIG. 8 and (b) of FIG. 8, the temperature of the processor having electric leakage at the same position is significantly higher than the temperature of the processor having no electric leakage at the same position.

Based on the foregoing embodiments, in a case that the developer simulates the user using the electronic device to execute different tasks (different tasks correspond to different application scenarios), infrared thermal images of the electronic components in different scenarios are obtained through scanning by the infrared thermal imager, and temperature contours of the electronic components in different scenarios are established. Subsequently, the temperature contours of the electronic components in different scenarios are stored in the electronic device. In other words, at the early stage of device debugging, the temperature contours of the electronic components in different scenarios have been stored in the device. The numbers annotated on the temperature contours can all be used as the preset temperature value described in the embodiments of this application.

During the use stage of the electronic device (that is, after the electronic device leaves the factory), the electronic device may detect the temperature of each electronic component in a current application scenario, and determine an electronic component of which the temperature is greater than the preset temperature value as an electronic component having electric leakage. For example, a plurality of temperature sensors (or referred to as a plurality of second electronic components) may be arranged in the electronic device, and these temperature sensors are configured to detect temperatures of the electronic components, so that when an electronic component has an electric leakage problem, the electronic component having the electric leakage problem can be intelligently identified. In some embodiments, the temperature sensor may be integrated inside the electronic component (that is, components of the electronic component include the temperature sensor). In some other embodiments, the temperature sensor may be separately arranged on the main board of the electronic device (for example, the main board shown in FIG. 4). It is to be noted that, a position at which the temperature sensor is arranged on the main board may be set according to actual needs, which is not limited in this embodiment of this application.

Figure 9:
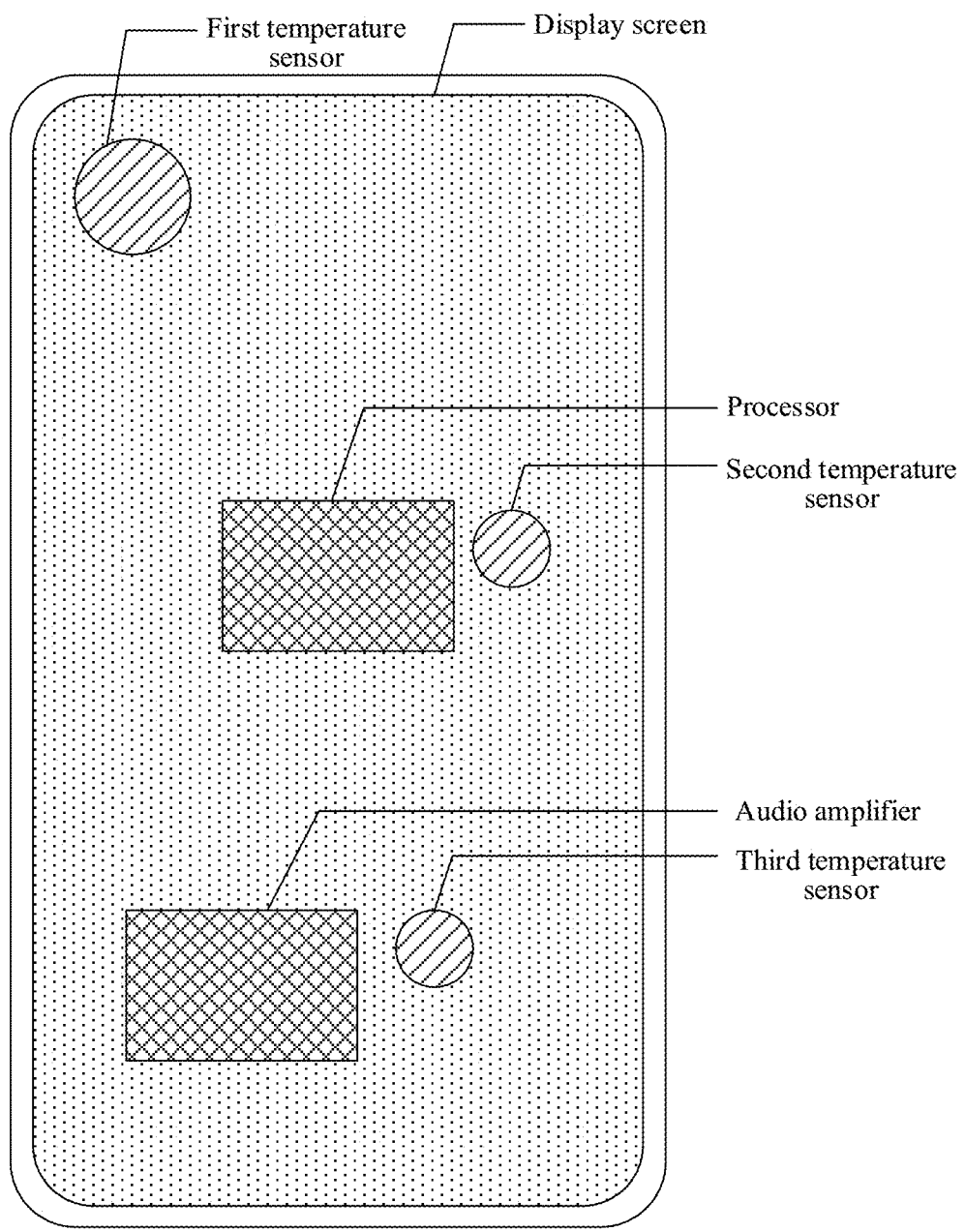
FIG. 9 is a schematic diagram of a positional relationship between an electronic component and a temperature sensor according to an embodiment of this application.

For example, the temperature sensor may be arranged near the electronic component, thereby facilitating detecting the temperature of the electronic component. An example in which the plurality of electronic components includes a display screen, a processor, and an audio amplifier is used for illustration. For example, the electronic device may further include a first temperature sensor, a second temperature sensor, and a third temperature sensor. The first temperature sensor is configured to detect temperature data of the display screen, the second temperature sensor is configured to detect temperature data of the processor, and the third temperature sensor is configured to detect temperature data of the audio amplifier. For example, as shown in FIG. 9, the first temperature sensor is arranged near the display screen, thereby facilitating detecting the temperature data of the display screen: the second temperature sensor is arranged near the processor, thereby facilitating detecting the temperature data of the processor; and the third temperature sensor is arranged near the audio amplifier, thereby facilitating detecting the temperature data of the audio amplifier.

It is to be noted that, arranging the temperature sensor near the electronic component means that a distance between the temperature sensor and the electronic component is less than or equal to a preset distance. The preset distance may be set according to specific needs, which is not limited in this embodiment of this application.

In some embodiments, the temperature sensor stores an identifier of the corresponding electronic component. After the temperature sensor detects the temperature of the electronic component, the electronic device may determine, according to the identifier of the electronic component stored in the temperature sensor, the electronic component corresponding to the temperature detected by the temperature sensor. For example, the first temperature sensor stores an identifier of the display screen, where the identifier may be, for example, LCD_them: the second temperature sensor stores an identifier of the processor, where the identifier may be, for example, CPU_them: the third temperature sensor stores an identifier of the audio amplifier, where the identifier may be, for example, SmartPA_them.

The following describes the electric leakage detection method for an electronic component provided in the embodiments of this application in detail with reference to the accompanying drawings in the specification.

Figure 10:
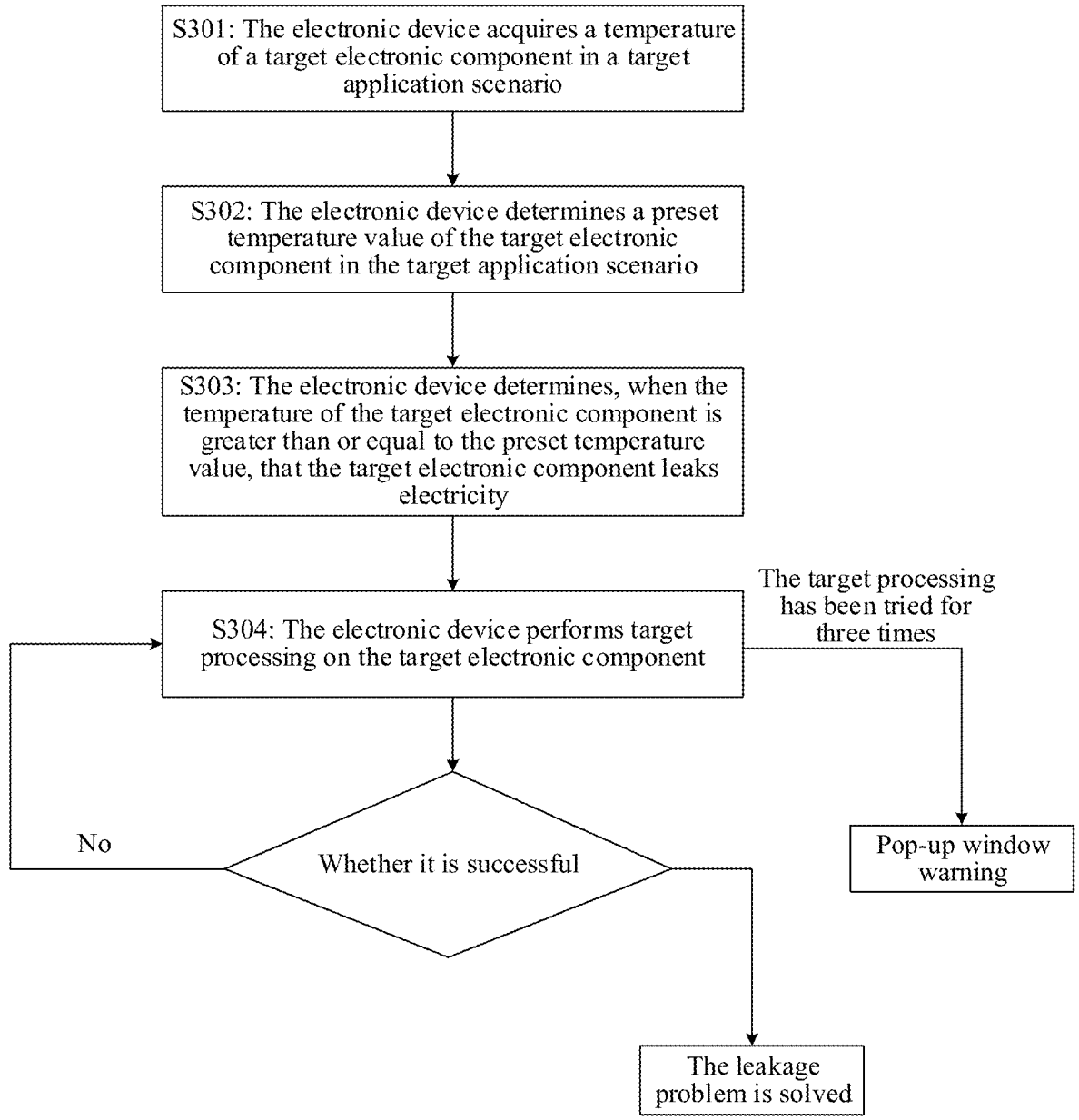
FIG. 10 is a schematic flowchart 1 of an electric leakage detection method for an electronic component according to an embodiment of this application.

FIG. 10 is a schematic flowchart of an electric leakage detection method for an electronic component according to an embodiment of this application. As shown in FIG. 10, when the electronic device executes a task, in an application scenario corresponding to the task, the electronic device performs steps S301 to S304. It should be understood that, the electronic device stores temperature contours of each electronic component in different application scenarios.

S301: The electronic device acquires a temperature of a target electronic component in a target application scenario.

The target application scenario is an application scenario corresponding to a task (for example, a target task) currently executed by the electronic device; and the target electronic component is any one of a plurality of electronic components.

For example, the target application scenario may be, for example, an audio scenario or a game scenario.

In some embodiments, the electronic device detects a temperature of an electronic component through a temperature sensor. On this basis, a plurality of temperature sensors are arranged in the electronic device, and one temperature sensor corresponds to one electronic component. The electronic device can detect, through a temperature sensor, a temperature of the target electronic component corresponding to the temperature sensor.

For example, as shown in FIG. 9, when the target electronic component is a display screen, the electronic device detects a temperature of the display screen through a first temperature sensor: when the target electronic component is a processor, the electronic device detects a temperature of the processor through a second temperature sensor; and when the target electronic component is an audio amplifier, the electronic device detects a temperature of the audio amplifier through a third temperature sensor.

S302. The electronic device determines a preset temperature value of the target electronic component in the target application scenario.

An example in which the target application scenario is an audio scenario and the target electronic component is an audio amplifier is used for illustration. For example, the electronic device determines a preset temperature value of the audio amplifier according to temperature contours around the audio amplifier and position information of the target temperature sensor in the audio scenario. The target temperature sensor is a temperature sensor for detecting the target electronic component. For example, when the target electronic component is an audio amplifier, the target temperature sensor is the third temperature sensor described in the foregoing embodiments.

It is to be noted that, the temperature contours of the audio amplifier herein are: temperature contours established in a case that the audio amplifier is normal. For example, with reference to FIG. 7, the temperature contours of the audio amplifier are the temperature contours shown in (a) of FIG. 7.

Figure 7:
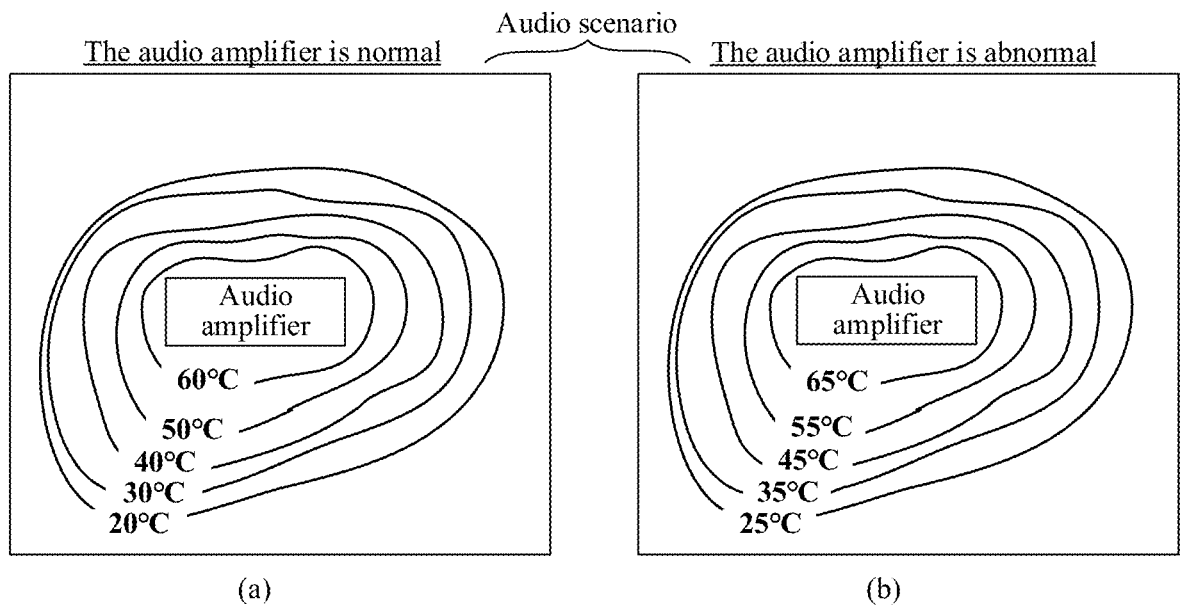
FIG. 7 is a schematic diagram of a temperature contour of an audio amplifier in an audio scenario according to an embodiment of this application.
Figure 11:
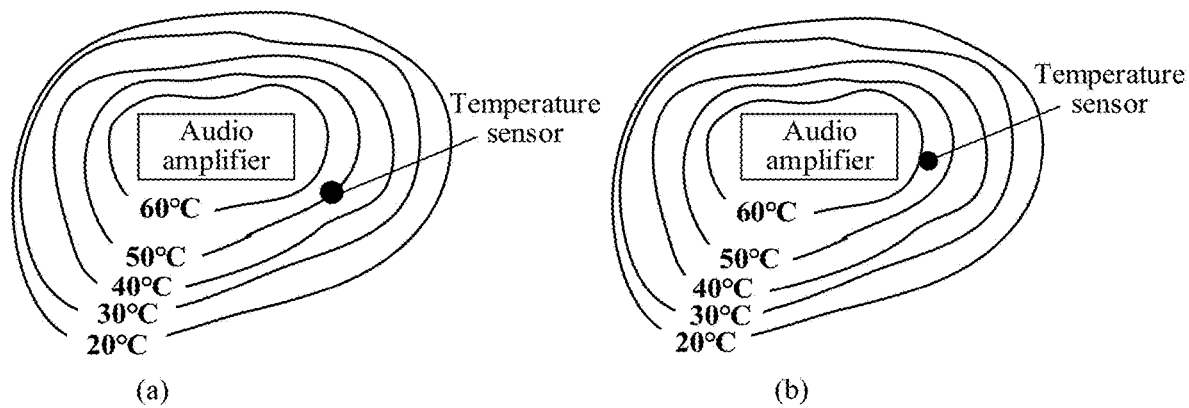
FIG. 11 is a schematic diagram of determining a preset temperature value according to a temperature contour map according to an embodiment of this application.

For example, based on the temperature contours shown in (a) of FIG. 7, the preset temperature value of the audio amplifier is determined according to the position information of the target temperature sensor. The position information of the target temperature sensor refers to a position at which the target temperature sensor is arranged around the audio amplifier. For example, as shown in (a) of FIG. 11, when the target sensor is arranged at a position of a temperature contour of the audio amplifier (that is, the target sensor coincides with the temperature contour of the audio amplifier), the preset temperature value of the audio amplifier is a temperature (for example, 50° C.) annotated on the temperature contour coincident with the position of the target sensor. In another example, as shown in (b) of FIG. 11, when the target sensor is arranged between two adjacent temperature contours of the audio amplifier, the preset temperature value of the audio amplifier is a temperature (for example, 60° C.) annotated on the temperature contour close to the center position of the target sensor.

S303: The electronic device determines, when the temperature of the target electronic component is greater than or equal to the preset temperature value, that the target electronic component leaks electricity.

For example, when the preset temperature value is 50° C., if the temperature of the target electronic component is 51° C., it is determined that the target electronic component has electric leakage.

S304: The electronic device performs target processing on the target electronic component.

The target processing is configured to eliminate the leakage of the target electronic component. For example, the target processing includes one or more processing types of: reducing a refresh rate of a display screen, reducing picture quality, reducing backlight brightness, reducing a frequency of a processor, reducing a load of the electronic component, reducing power of the electronic component, or lowering a volume. In some embodiments, the target processing may be, for example, a reset operation.

In some embodiments, the electronic device may select corresponding target processing according to the target application scenario and the target electronic component. In other words, in the same application scenario, different target processing may be selected for different electronic components.

For example, in a game scenario, when the electronic component is a display screen, the target processing may be, for example, one or more processing types of: reducing a refresh rate, reducing picture quality, or reducing backlight brightness; and when the electronic component is a CPU, the target processing may be, for example, reducing a CPU frequency (or unplugging the core).

In some embodiments, the electronic device may also select a different processing type of the target processing according to the preset temperature value, that is, when the preset temperature value is different, the processing type of the target processing is also different. In addition, when the preset temperature value is different, a processing granularity of the target processing type is also different.

With reference to the foregoing embodiments, for example, when the preset temperature value (or referred to as a target temperature value) falls within a first range, the target processing includes M processing types; and when the preset temperature value falls within a second range, the target processing includes N processing types, where M and N are positive integers. It is to be noted that, the range is only used as an example for illustration in the embodiments of this application, and does not constitute a limitation to this application. The range may alternatively be replaced with other descriptions such as "mode" or "level".

In some embodiments, a maximum value of the first range is less than a minimum value of the second range. That is, the preset temperature value in the second range is higher than the preset temperature value in the first range. For example, the range may be, for example, [25° C., 70° C.], where the first range may be, for example, [25° C., 45° C.]; and the second range may be, for example, [46° C., 70° C.].

In some embodiments, a maximum value of the first range is less than a minimum value of the second range, and M is less than N. That is, a smaller preset temperature value indicates fewer corresponding processing types of the target processing; and correspondingly, a larger preset temperature value indicates more corresponding processing types of the target processing. An example in which the electronic component is a display screen is used. For example, when the preset temperature value is 35° C., the target processing may include reducing backlight brightness; and when the preset temperature value is 45° C., the target processing may include reducing backlight brightness and reducing picture quality.

For example, in this embodiment, sizes of the processing granularity of the M processing types and the processing granularity of the N processing types are not limited. For example, when the preset temperature value is 35° C., the target processing may include reducing backlight brightness to 60%; and when the preset temperature value is 45° C., the target processing may include reducing backlight brightness to 90% and reducing picture quality. It can be seen that although M is less than N, the processing granularity of the M processing types is greater than the processing granularity of the N processing types.

In some other embodiments, when a maximum value of the first range is less than a minimum value of the second range, the M processing types are the same as the N processing types, and a processing granularity of at least one of the N processing types is greater than a processing granularity of a corresponding processing type in the M processing types. An example in which the electronic component is a display screen is still used. For example, when the preset temperature value is 55° C., the target processing includes N (for example, two) processing types (such as reducing backlight brightness and reducing picture quality); and when the preset temperature value is 35° C., the target processing includes M (for example, two) processing types (such as reducing backlight brightness and reducing picture quality). In some embodiments, an example in which at least one of the N (for example, two) processing types is reducing backlight brightness is used. For example, when the preset temperature value is 55° C., the target processing includes reducing backlight brightness×90%; and when the preset temperature value is 35° C., the target processing includes reducing backlight brightness×90%.

For example, in different application scenarios, for the target processing corresponding to different electronic components with different preset temperature values, reference may be made to Table 1 below. Table 1 uses a game scenario and an audio scenario as examples for illustration. In the game scenario, target electronic components are, for example, a display screen and a CPU; and in the audio scenario, target electronic components are, for example, a CPU and an audio amplifier.

TABLE 1

| Game scenario | Display screen | Preset temperature value | 25° C. | 30° C. | 35° C. | 40° C. | 45° C. | 50° C.+ |
|---|---|---|---|---|---|---|---|---|
| | | Target processing | Reducing a refresh rate | Reducing picture quality | Backlight brightness × 90% | Backlight brightness × 80% | Backlight brightness × 70% | Pop-up warning |
| | CPU | Preset temperature value | 40° C. | 50° C. | 60° C. | 70° C. | 75° C. | 80° C.+ |
| | | Target processing | CPU frequency × 80% | CPU frequency × 60% | CPU frequency × 40% | CPU frequency × 30% | Unplugging the core | Pop-up warning |
| Audio scenario | CPU | Preset temperature value | 25° C. | 35° C. | 45° C. | 55° C. | 65° C. | 75° C.+ |
| | | Target processing | CPU frequency × 90% | CPU frequency × 80% | CPU frequency × 70% | CPU frequency × 60% | CPU frequency × 50% | Pop-up warning |
| | Audio amplifier | Preset temperature value | 25° C. | 30° C. | 35° C. | 40° C. | 45° C. | 50° C.+ |
| | | Target processing | Reducing a load | Reducing power | Volume × 90% | Volume × 80% | Volume × 70% | Pop-up warning |

As shown in Table 1 above, in the game scenario, when the preset temperature value of the display screen is 25° C., if the current temperature of the display screen is greater than 25° C., the target processing is reducing a refresh rate. When the preset temperature value of the display screen is 30° C., if the current temperature of the display screen is greater than 30° C., the target processing is reducing picture quality. When the preset temperature value of the display screen is 35° C., if the current temperature of the display screen is greater than 35° C., the target processing is reducing backlight brightness to 90%. When the preset temperature value of the display screen is 40° C., if the current temperature of the display screen is greater than 40° C., the target processing is reducing backlight brightness to 80%. When the preset temperature value of the display screen is 45° C., if the current temperature of the display screen is greater than 45° C., the target processing is reducing backlight brightness to 70%. When the preset temperature value of the display screen is 50° C., if the current temperature of the display screen is greater than 50° C., the electronic device triggers a pop-up window warning. The pop-up window warning is used for prompt the user that the electronic device fails. For example, the pop-up window warning may be: whether the electronic device fails, whether to exit the application. Alternatively, the pop-up window warning is: the current temperature of the electronic device is excessively high and it cannot continue to work.

It is to be noted that, in the above Table 1, for examples and descriptions of the CPU in the game scenario and examples and descriptions of the CPU and the audio amplifier in the audio scenario, reference may be made to the foregoing embodiments, and details will not be repeated one by one herein again.

In a case that the target electronic component leaks electricity, the electronic device may perform target processing on the target electronic component to solve the electric leakage problem of the target electronic component. In some embodiments, when a quantity of times for which the electronic device has performed the target processing on the target electronic component reaches a preset quantity of times (or referred to as a first preset quantity of times), if the electronic device has not solved the electric leakage problem of the target electronic component, the electronic device will display indication information (for example, trigger a pop-up window warning). In some other embodiments, when the preset temperature value is greater than or equal to a second threshold, the electronic device displays indication information (for example, triggers a pop-up window warning). The indication information is used for prompting a user that the electronic device does not support continuing to execute the target task; or the indication information is used for prompting a user whether to end the target task.

For example, referring to Table 1 above, an example in which the electronic component is a display screen is used. For example, when the preset temperature value is greater than or equal to 50° C., the electronic device triggers a pop-up window warning.

It is to be noted that, the preset quantity of times may be set according to actual needs, and the preset quantity of times is not specifically limited in this embodiment of this application. For example, the preset quantity of times may be 3, 4, or 5 or more.

Figure 12:
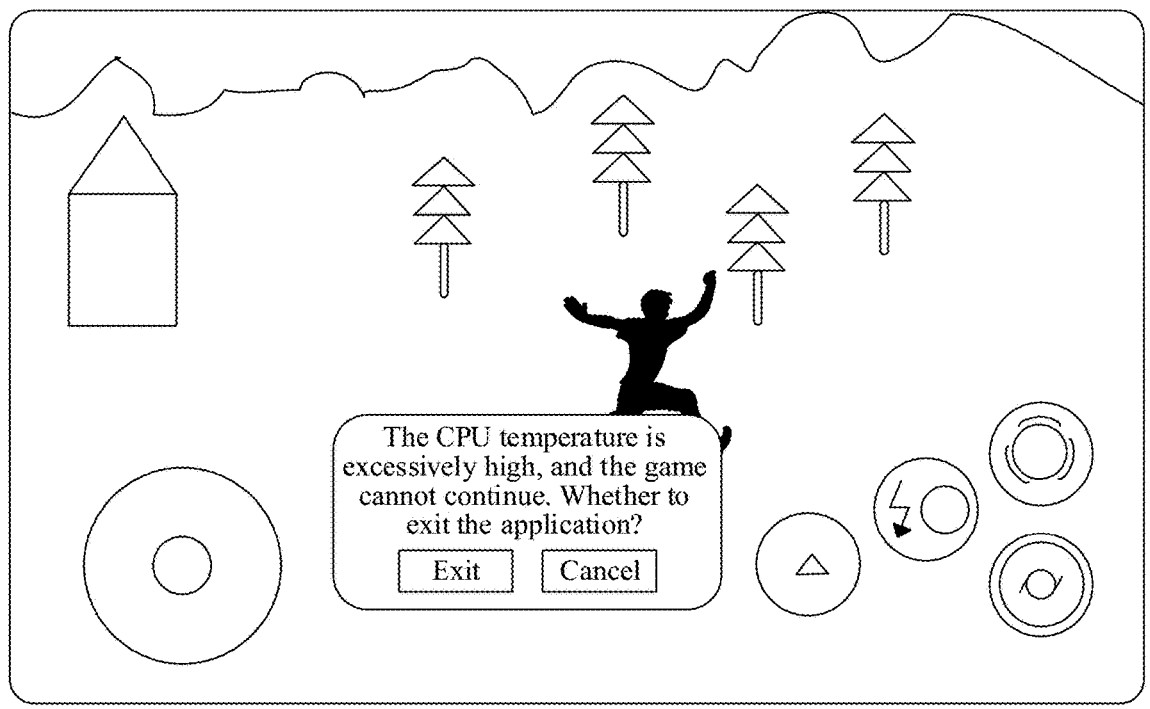
FIG. 12 is a schematic diagram of an interface for displaying a pop-up window warning according to an embodiment of this application.

An example in which the application scenario is a game scenario is used. For example, when a user uses an electronic device to play a game, if the electronic device detects that the CPU leaks electricity, and after the electronic device have tried to perform target processing on the CPU for 3 times, the electric leakage problem of the CPU still has not been solved, in this case, the electronic device may trigger a pop-up window warning to prompt the user that the CPU temperature is excessively high and the game cannot continue. For example, as shown in FIG. 12, the pop-up window warning is: The CPU temperature is excessively high, and the game cannot continue. Whether to exit the application? On this basis, after the user clicks an "exit" control, the electronic device exits the application; and after the user clicks a "cancel" control, the user can continue the game.

In order to ensure user safety, in some embodiments, when the quantity of times for which the "cancel" control on the electronic device has been consecutively clicked is greater than a threshold (or referred to as a second preset quantity of times) (for example, 3), the electronic device may automatically exit the application. Alternatively, the electronic device triggers a shutdown mode, so that the electronic device enters a shutdown state.

To sum up, in this embodiment of this application, the electronic device detects the temperature of the target electronic component, and compares the temperature of the target electronic component with the preset temperature value, and if the temperature of the target electronic component is greater than or equal to the preset temperature value, it is determined that the target electronic component has an electric leakage problem. In this way, not only the time and manpower required for detecting electric leakage of electronic components are saved, but also the detection efficiency is improved.

In addition, in a case that it is determined that the target electronic component has an electric leakage problem, the electronic device may further perform target processing on the target electronic component to solve the electric leakage problem of the target electronic component.

Figure 13:
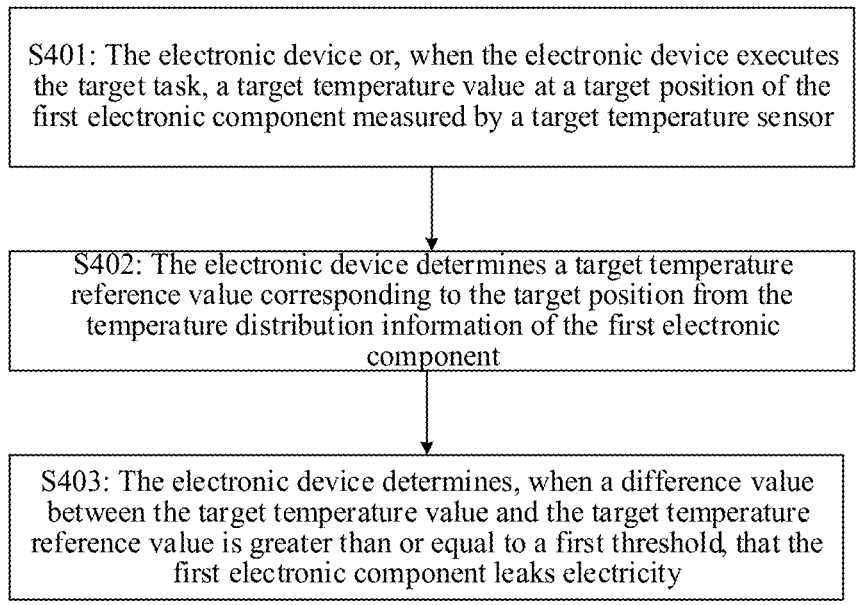
FIG. 13 is a schematic flowchart 2 of an electric leakage detection method for an electronic component according to an embodiment of this application.

FIG. 13 is a schematic flowchart of an electric leakage detection method for an electronic component according to an embodiment of this application. For example, the method includes S401 to S403.

The electric leakage detection method for an electronic component provided in this embodiment of this application is applied to an electronic device, where the electronic device includes a plurality of first electronic components and a plurality of second electronic components, and the second electronic components are configured to detect temperatures of the first electronic components; and the electronic device further stores temperature distribution information of each of the first electronic components, and the temperature distribution information is used for indicating a plurality of temperature reference values at different positions on the first electronic component when the electronic device executes a target task.

It is to be noted that, the plurality of first electronic components may be, for example, the plurality of electronic components described in the foregoing embodiments (such as a processor, a fast charging chip, a flash memory, a Bluetooth chip, an audio amplifier, and a power amplifier); and the plurality of second electronic components may be, for example, the plurality of temperature sensors described in the foregoing embodiments.

For example, the temperature distribution information may be, for example, the temperature coordinate system described in the foregoing embodiments or temperature contours (or referred to as a temperature contour map). In a case that the temperature distribution information is a temperature contour map, the temperature contour map includes a plurality of closed curves, and temperature reference values on a same closed curve are the same.

S401: The electronic device or, when the electronic device executes the target task, a target temperature value at a target position of the first electronic component measured by a target temperature sensor.

The target temperature sensor is one of the plurality of second electronic components.

For example, the target task may be any one of the different tasks executed by the electronic device in the foregoing embodiments. For example, the target task may be a game task (that is, a game task executed by the electronic device), or an audio playback task (that is, an audio playback task executed by the electronic device). Application scenarios of the electronic device corresponding to different target tasks are different. For example, when the target task is a game task, the application scenario of the electronic device is a game scenario; and when the target task is an audio playback task, the application scenario of the electronic device is an audio scenario. It should be understood that, when the electronic device executes the target task, the application scenario of the electronic device may be, for example, the target application scenario described in the foregoing embodiments.

It is to be noted that, the target position is a position at which the target temperature sensor is located. The target temperature sensor is configured to detect the temperature of the first electronic component. Therefore, the target temperature value detected by the target temperature sensor at the target position is the target temperature value at a certain position of the first electronic component. The first electronic component herein may be, for example, the target electronic component described in the foregoing embodiments.

It should be understood that, the target temperature sensor may be arranged inside the first electronic component (that is, components of the first electronic component include the target temperature sensor). In this case, the target position is a position at which the target temperature sensor is arranged inside the electronic component. Correspondingly, the target temperature sensor may alternatively be arranged near the first electronic component (that is, the components of the first electronic component does not include the target temperature sensor). In this case, the target position is a position at which the target temperature sensor is arranged around the electronic component.

In some embodiments, when the first electronic component is different, the corresponding target temperature sensor for detecting the first electronic component is also different. For example, as shown in FIG. 9, when the first electronic component is a display screen, the target temperature sensor is a first temperature sensor: when the first electronic component is a processor, the target temperature sensor is a second temperature sensor; and when the first electronic component is an audio amplifier, the target temperature sensor is a third temperature sensor.

S402: The electronic device determines a target temperature reference value corresponding to the target position from the temperature distribution information of the first electronic component.

It is to be noted that, the target temperature reference value herein may be, for example, the preset temperature value described in the foregoing embodiments.

An example in which the temperature distribution information is a temperature contour map is used. In some embodiments, when the target position is located between two adjacent closed curves (that is, the target temperature sensor is located between two adjacent closed curves), the target temperature reference value is a temperature reference value on a closed curve in the two adjacent closed curves that is close to the target position. For example, as shown in (b) of FIG. 11, when a temperature sensor (for example, the target temperature sensor) is located between two adjacent closed curves, the target temperature reference value is a temperature reference value (for example, 60° C.) on a closed curve in the two adjacent closed curves that is close to the target position (that is, a position at which the target temperature sensor is located).

Alternatively, when the target position is located between two adjacent closed curves (that is, the target temperature sensor is located between two adjacent closed curves), the target temperature reference value is the temperature reference value at the target position. For example, the electronic device may obtain the temperature reference value at the target position through interpolation calculation according to the temperature reference values on the two adjacent closed curves, so as to determine the temperature reference value at the target position as the target temperature reference value.

Alternatively, when the target position coincides with a closed curve (that is, the target temperature sensor), the target temperature reference value is a temperature reference value on the closed curve. For example, as shown in (a) of FIG. 11, when a temperature sensor (for example, the target temperature sensor) is located on a closed curve, the target temperature reference value is a temperature reference value on the closed curve.

S403: The electronic device determines, when a difference value between the target temperature value and the target temperature reference value is greater than or equal to a first threshold, that the first electronic component leaks electricity. It is to be noted that, the first threshold may be set according to specific needs, and the first threshold is not limited in this embodiment of this application. In some embodiments, the first threshold is, for example, equal to zero, that is, the target temperature value is equal to the target temperature reference value.

In this embodiment, the electronic device includes a plurality of first electronic components and a plurality of second electronic components, and the second electronic components are configured to detect temperatures of the first electronic components; and when the electronic device executes the target task, the electronic device acquires a target temperature value at a target position on the first electronic component measured by a target temperature sensor, where the target temperature sensor is one of the plurality of second electronic components. Because the electronic device stores temperature distribution information of each of the first electronic components, and the temperature distribution information is used for indicating a plurality of temperature reference values at different positions on the first electronic component when the electronic device executes a target task, the electronic device can determine a target temperature reference value corresponding to the target position from the temperature distribution information of the first electronic component. When a difference value between the target temperature value and the target temperature reference value is greater than or equal to a first threshold, the electronic device determines that the first electronic component leaks electricity, so that a component having an electric leakage problem in the electronic device can be detected, thereby reducing the detection costs and improving the detection efficiency.

An embodiment of this application provides an electronic device, where the electronic device includes a plurality of electronic components and a plurality of temperature sensors: the temperature sensors are configured to detect temperatures of the electronic components: the plurality of electronic components include a display screen, a memory, and one or more processors; and the memory stores computer program code, the computer program code includes computer instructions, and when the computer instructions are executed by the processor, the electronic device is enabled to perform the functions or steps performed by the electronic device in the foregoing embodiments. For a structure of the electronic device, reference may be made to the structure of the electronic device 100 shown in FIG. 1.

Figure 14:
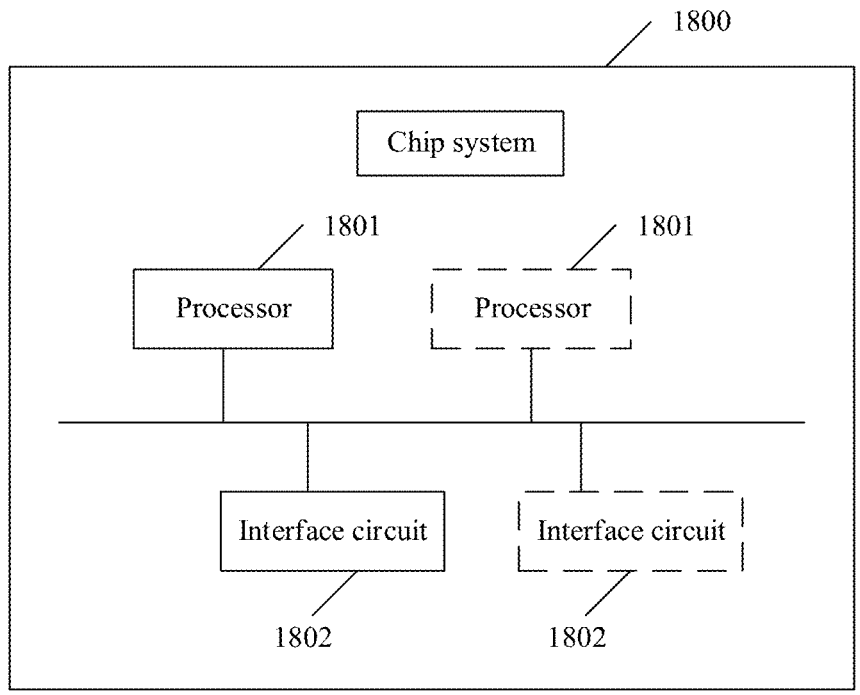
FIG. 14 is a schematic structural diagram of a chip system according to an embodiment of this application.

An embodiment of this application further provides a chip system. As shown in FIG. 14, the chip system 1800 includes at least one processor 1801 and at least one interface circuit 1802. The processor 1801 may be the processor 110 shown in FIG. 1 in the foregoing embodiments. The interface circuit 1802 may be, for example, an interface circuit between the processor 110 and the external memory 120, or an interface circuit between the processor 110 and the internal memory 121.

The processor 1801 and the interface circuit 1802 may be interconnected by a line. In an example, the interface circuit 1802 may be configured to receive a signal from another apparatus (such as the memory of the electronic device). In another example, the interface circuit 1802 may be configured to transmit a signal to another apparatus (for example, the processor 1801). For example, the interface circuit 1802 may read the instructions stored in the memory and send the instructions to the processor 1801. The instructions, when executed by the processor 1801, may cause the electronic device to perform the steps performed by the electronic device in the foregoing embodiments. Certainly, the chip system may further include other discrete devices. This is not specifically limited in this embodiment of this application.

An embodiment of this application further provides a computer-readable storage medium. The computer-readable storage medium includes computer instructions. When the computer instructions run on an electronic device, the electronic device is enabled to perform the functions or steps performed by the electronic device in the foregoing method embodiments.

An embodiment of this application further provides a computer program product. When the computer program product is run on a computer, the computer is enabled to perform the functions or steps performed by the electronic device in the foregoing method embodiments.

Through the descriptions of the foregoing implementations, a person skilled in the art may clearly understand that, for the purpose of convenient and brief description, only division of the foregoing functional modules is used as an example for description. In actual application, the foregoing functions may be allocated to and completed by different functional modules according to requirements. That is, an inner structure of an apparatus is divided into different functional modules to complete all or some of the functions described above.

In the several embodiments provided in this application, it should be understood that the disclosed apparatus and method may be implemented in other manners. For example, the described apparatus embodiment is merely exemplary. For example, the module or unit division is merely a logical function division and may be other division during actual implementations. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may be one or more physical units, may be located in one place, or may be distributed on a plurality of different places. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a read-only memory (read only memory, ROM), a random access memory (random access memory, RAM), a magnetic disk, a compact disc, or the like.

The foregoing content is only specific implementations of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An electric leakage detection method for an electronic component, applied to an electronic device, wherein the electronic device comprises a plurality of first electronic components and a plurality of second electronic components, and the second electronic components are configured to detect temperatures of the first electronic components; the electronic device stores temperature distribution information of each of the plurality of first electronic components, and the temperature distribution information is used for indicating a plurality of temperature reference values at different positions on the respective first electronic component when the electronic device executes a target task; and the method comprises:
    acquiring, by the electronic device when the electronic device executes the target task, a target temperature value at a target position on the first electronic component measured by a target temperature sensor, wherein the target temperature sensor is one of the plurality of second electronic components;
    determining, by the electronic device, a target temperature reference value corresponding to the target position from the temperature distribution information of the first electronic component;
    determining, by the electronic device when a difference value between the target temperature value and the target temperature reference value is greater than or equal to a first threshold, that the first electronic component leaks electricity; and
    displaying, by the electronic device, indication information when the target temperature reference value is greater than or equal to a second threshold, wherein the indication information is used for prompting a user that the electronic device does not support continuing to execute the target task; or the indication information is used for prompting a user whether to end the target task.

2. The method according to claim 1, wherein the temperature distribution information is a temperature contour map, the temperature contour map comprises a plurality of closed curves, and temperature reference values on a same closed curve are the same; and the determining, by the electronic device, a target temperature reference value corresponding to the target position from the temperature distribution information of the first electronic component comprises:
    when the target position is located between two adjacent closed curves, the target temperature reference value being a temperature reference value on a closed curve in the two adjacent closed curves that is close to the target position; or
    determining, by the electronic device when the target position is located between two adjacent closed curves, the target temperature reference value according to temperature reference values on the two adjacent closed curves; or
    when the target position coincides with a closed curve, the target temperature reference value being a temperature reference value on the closed curve.

3. The method according to claim 2, wherein
the temperature contour map is established after the electronic device pre-executes the target task at least once under normal circumstances.

4. The method according to claim 1, further comprising:
performing, by the electronic device, target processing on the first electronic component when the electronic device determines that the first electronic component leaks electricity, wherein the target processing is used for eliminating leakage of the first electronic component.

5. The method according to claim 4, wherein
the target processing comprises one or more processing types of: reducing a refresh rate of a display screen, reducing picture quality, reducing backlight brightness, reducing a frequency of a processor, reducing a load of the first electronic component, reducing power of the first electronic component, or lowering a volume.

6. The method according to claim 4, wherein:
when the target temperature value falls within a first range, the target processing comprising M processing types; and
when the target temperature value falls within a second range, the target processing comprising N processing types, wherein
a maximum value of the first range is less than a minimum value of the second range, and M is less than N; or
a maximum value of the first range is less than a minimum value of the second range, the M processing types are the same as the N processing types, and a processing granularity of at least one of the N processing types is greater than a processing granularity of a corresponding processing type in the M processing types; and M and N are positive integers.

7. The method according to claim 4, further comprising:
displaying, by the electronic device, indication information when a quantity of times for which the electronic device has performed the target processing on the first electronic component is greater than or equal to a first preset quantity of times, and the electronic device has not eliminated the leakage of the first electronic component, wherein the indication information is used for prompting a user that the electronic device does not support continuing to execute the target task; or the indication information is used for prompting a user whether to end the target task.

8. The method according to claim 1, further comprising:
ending, by the electronic device, the target task in response to a confirmation operation of the user; or
continuing, by the electronic device in response to a cancel operation of the user, to execute the target task.

9. The method according to claim 8, further comprising:
automatically ending, by the electronic device, the target task when a quantity of times of the cancel operations of the user is greater than or equal to a second preset quantity of times; or
automatically shutting down by the electronic device when a quantity of times of the cancel operations of the user is greater than or equal to a second preset quantity of times.

10. An electronic device, comprising a plurality of first electronic components and a plurality of second electronic components, wherein the second electronic components are configured to detect temperatures of the first electronic components; the plurality of first electronic components comprise a display screen, a memory, and one or more processors; and the display screen, the memory, and the one or more processors are coupled; and
the memory is configured to store computer program code and temperature distribution information of each of the plurality of first electronic components, and the temperature distribution information is used for indicating a plurality of temperature reference values at different positions on the respective first electronic component when the electronic device executes a target task; the computer program code comprises computer instructions; and when the one or more processors executes the computer instructions, the electronic device is enabled to:
acquire a target temperature value at a target position on the first electronic component measured by a target temperature sensor when executing the target task, wherein the target temperature sensor is one of the plurality of second electronic components;
determine a target temperature reference value corresponding to the target position from the temperature distribution information of the first electronic component;
determine the first electronic component leaks electricity when a difference value between the target temperature value and the target temperature reference value is greater than or equal to a first threshold; and
display indication information when the target temperature reference value is greater than or equal to a second threshold, wherein the indication information is used for prompting a user that the electronic device does not support continuing to execute the target task; or the indication information is used for prompting a user whether to end the target task.

11. The electronic device according to claim 10, wherein the temperature distribution information is a temperature contour map, the temperature contour map comprises a plurality of closed curves, and temperature reference values on a same closed curve are the same; and the determine a target temperature reference value corresponding to the target position from the temperature distribution information of the first electronic component comprises:
when the target position is located between two adjacent closed curves, the target temperature reference value being a temperature reference value on a closed curve in the two adjacent closed curves that is close to the target position; or
determine the target temperature reference value according to temperature reference values on the two adjacent closed curves when the target position is located between two adjacent closed curves; or
when the target position coincides with a closed curve, the target temperature reference value being a temperature reference value on the closed curve.

12. The electronic device according to claim 11, wherein the temperature contour map is established after the electronic device pre-executes the target task at least once under normal circumstances.

13. The electronic device according to claim 10, the electronic device is further enabled to perform target processing on the first electronic component when determining that the first electronic component leaks electricity, wherein the target processing is used for eliminating leakage of the first electronic component.

14. The electronic device according to claim 13, wherein the target processing comprises one or more processing types of: reducing a refresh rate of a display screen, reducing picture quality, reducing backlight brightness, reducing a frequency of a processor, reducing a load of the first electronic component, reducing power of the first electronic component, or lowering a volume.

15. The electronic device according to claim 13, wherein:
when the target temperature value falls within a first range, the target processing comprising M processing types; and
when the target temperature value falls within a second range, the target processing comprising N processing types, wherein
a maximum value of the first range is less than a minimum value of the second range, and M is less than N; or
a maximum value of the first range is less than a minimum value of the second range, the M processing types are the same as the N processing types, and a processing granularity of at least one of the N processing types is greater than a processing granularity of a corresponding processing type in the M processing types; and M and N are positive integers.

16. The electronic device according to claim 13, the electronic device is further enabled to display indication information when a quantity of times for which the electronic device has performed the target processing on the first electronic component is greater than or equal to a first preset quantity of times, and the electronic device has not eliminated the leakage of the first electronic component, wherein the indication information is used for prompting a user that the electronic device does not support continuing to execute the target task; or the indication information is used for prompting a user whether to end the target task.

17. The electronic device according to claim 10, the electronic device is further enabled to end the target task in response to a confirmation operation of the user; or
continue to execute the target task in response to a cancel operation of the user.

18. A non-transitory computer-readable storage medium, comprising computer instructions, wherein when the computer instructions are run on an electronic device, the electronic device is enabled to:

acquire a target temperature value at a target position on a first electronic component measured by a target temperature sensor when executing a target task, wherein the electronic device comprises a plurality of first electronic components including the first electronic component and a plurality of second electronic components, wherein the second electronic components are configured to detect temperatures of the first electronic components, the electronic device stores temperature distribution information of each of the plurality of first electronic components, and the temperature distribution information is used for indicating a plurality of temperature reference values at different positions on the respective first electronic component when the electronic device executes a target task, wherein the target temperature sensor is one of the plurality of second electronic components;

determine a target temperature reference value corresponding to the target position from the temperature distribution information of the first electronic component;

determine the first electronic component leaks electricity when a difference value between the target temperature value and the target temperature reference value is greater than or equal to a first threshold; and display indication information when the target temperature reference value is greater than or equal to a second threshold, wherein the indication information is used for prompting a user that the electronic device does not support continuing to execute the target task; or the indication information is used for prompting a user whether to end the target task.

19. The non-transitory computer-readable storage medium according to claim 18, wherein the electronic device is further enabled to perform target processing on the first electronic component when determining that the first electronic component leaks electricity, wherein the target processing is used for eliminating leakage of the first electronic component.

20. The non-transitory computer-readable storage medium according to claim 19, wherein the target processing comprises one or more processing types of: reducing a refresh rate of a display screen, reducing picture quality, reducing backlight brightness, reducing a frequency of a processor, reducing a load of the first electronic component, reducing power of the first electronic component, or lowering a volume.

* * * * *